United States Patent
Fujita et al.

(10) Patent No.: US 8,135,423 B2
(45) Date of Patent: Mar. 13, 2012

(54) COMMUNICATION APPARATUS AND COMMUNICATION METHOD

(75) Inventors: Suguru Fujita, Tokyo (JP); Kazuaki Takahashi, Tokyo (JP); Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 960 days.

(21) Appl. No.: 12/095,053

(22) PCT Filed: Nov. 10, 2006

(86) PCT No.: PCT/JP2006/322461
§ 371 (c)(1),
(2), (4) Date: May 27, 2008

(87) PCT Pub. No.: WO2007/063689
PCT Pub. Date: Jun. 7, 2007

(65) Prior Publication Data
US 2009/0116572 A1 May 7, 2009

(30) Foreign Application Priority Data
Nov. 29, 2005 (JP) ................................ 2005-344173
Nov. 6, 2006 (JP) ................................ 2006-300576

(51) Int. Cl.
*H04B 7/00* (2006.01)
(52) U.S. Cl. .... 455/500; 455/502; 340/928; 340/870.11
(58) Field of Classification Search .................. 455/424, 455/425, 456.5, 456.6, 561, 550.1, 575.1, 455/63.1, 41.2, 502, 13.3, 562.1, 575.7, 103, 455/101, 500, 503, 444; 340/928, 29, 10.33, 340/13.37, 10.2, 807.11; 370/335, 350, 366, 370/208; 343/853, 879; 342/42
See application file for complete search history.

(56) References Cited

U.S. PATENT DOCUMENTS
5,485,520 A * 1/1996 Chaum et al. .................. 705/74
(Continued)

FOREIGN PATENT DOCUMENTS
JP 11-185083 7/1999
(Continued)

OTHER PUBLICATIONS
English language Abstract of JP 2004-266350, Sep. 24, 2004.
(Continued)

*Primary Examiner* — Duc Nguyen
*Assistant Examiner* — Charles Chow
(74) *Attorney, Agent, or Firm* — Greenblum & Bernstein, P.L.C.

(57) ABSTRACT

A communication apparatus is provided in which only a terminal having a specific positional relationship can perform communication through a relatively simple arrangement. When initial setting is performed or communication is started, a timing calculator calculates a time difference corresponding to the difference between a path from a first antenna to a terminal and a path from a second antenna to the terminal, based on a transmission signal from the first antenna and a reflection signal provided by having the transmission signal reflected from the second antenna or a communication partner, i.e. the terminal, and returned back to the first antenna. Based on the time difference thus calculated, the timing calculator outputs a signal for regulating the transmission timing of transmission data from the first antenna to a variable delay unit. The variable delay unit delays transmission timing of the transmission data depending on the timing regulation signal and outputs the delayed transmission data to a modulator/demodulator.

16 Claims, 18 Drawing Sheets

U.S. PATENT DOCUMENTS

| | | | |
|---|---|---|---|
| 5,675,342 A * | 10/1997 | Sharpe | 340/10.2 |
| 5,710,556 A * | 1/1998 | Nishimura et al. | 340/928 |
| 6,081,718 A * | 6/2000 | Ando et al. | 455/447 |
| 6,184,841 B1 * | 2/2001 | Shober et al. | 343/853 |
| 6,195,343 B1 * | 2/2001 | Watanabe | 370/335 |
| 6,526,039 B1 * | 2/2003 | Dahlman et al. | 370/350 |
| 6,661,352 B2 * | 12/2003 | Tiernay et al. | 340/928 |
| 6,731,242 B1 * | 5/2004 | Rapeli | 342/450 |
| 7,262,711 B2 * | 8/2007 | Zhu et al. | 340/928 |
| 7,317,720 B2 * | 1/2008 | Kamimura et al. | 370/366 |
| 7,382,275 B2 * | 6/2008 | Feldman et al. | 340/904 |
| 7,571,139 B1 * | 8/2009 | Giordano et al. | 705/40 |
| 7,783,311 B2 * | 8/2010 | Takiishi et al. | 455/502 |
| 7,786,892 B2 * | 8/2010 | Marty | 340/13.37 |
| 7,813,699 B2 * | 10/2010 | Ho et al. | 455/41.2 |
| 2003/0007470 A1 * | 1/2003 | Grilli et al. | 370/335 |
| 2004/0201457 A1 * | 10/2004 | O'Toole et al. | 340/10.33 |
| 2006/0056281 A1 * | 3/2006 | Ngo et al. | 370/208 |
| 2006/0056462 A1 | 3/2006 | Miyoshi | |
| 2006/0071816 A1 * | 4/2006 | Tang et al. | 340/928 |
| 2006/0198355 A1 | 9/2006 | Hagiwara | |
| 2006/0208169 A1 * | 9/2006 | Breed et al. | 250/221 |
| 2006/0253888 A1 | 11/2006 | Senga et al. | |
| 2008/0026753 A1 | 1/2008 | Okinoi et al. | |
| 2008/0095270 A1 | 4/2008 | Murakami et al. | |
| 2008/0123302 A1 | 5/2008 | Kawano et al. | |
| 2008/0125049 A1 | 5/2008 | Suzuki et al. | |
| 2010/0022193 A1 * | 1/2010 | Melis et al. | 455/73 |
| 2011/0165844 A1 * | 7/2011 | Jain et al. | 455/63.1 |

FOREIGN PATENT DOCUMENTS

JP    2004-266350    9/2004

OTHER PUBLICATIONS

English language Abstract of JP 11-185083, Jul. 9, 1999.

* cited by examiner

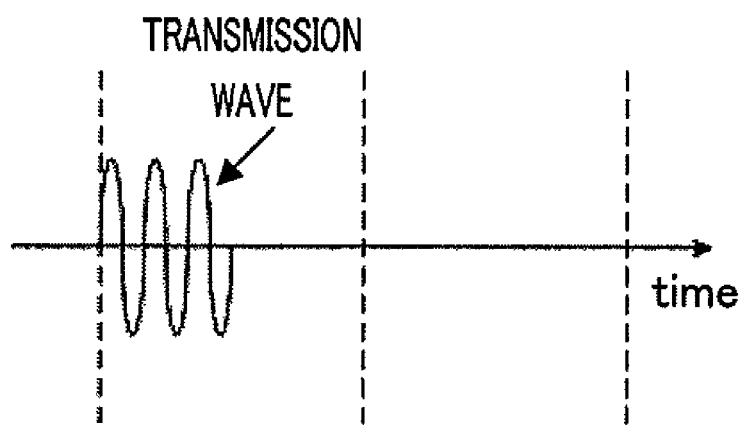
FIG.12A
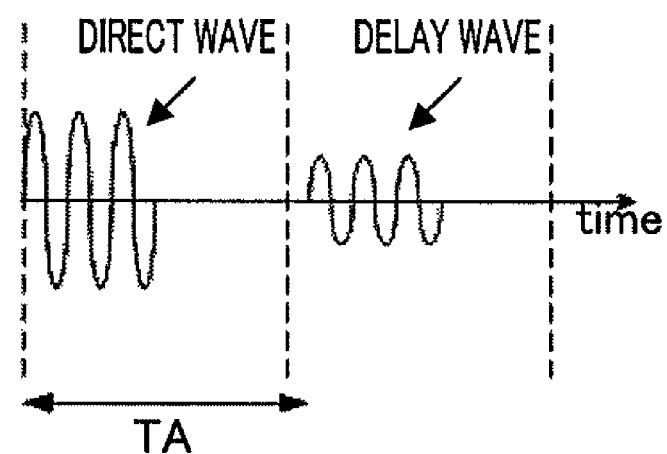
FIG.12B
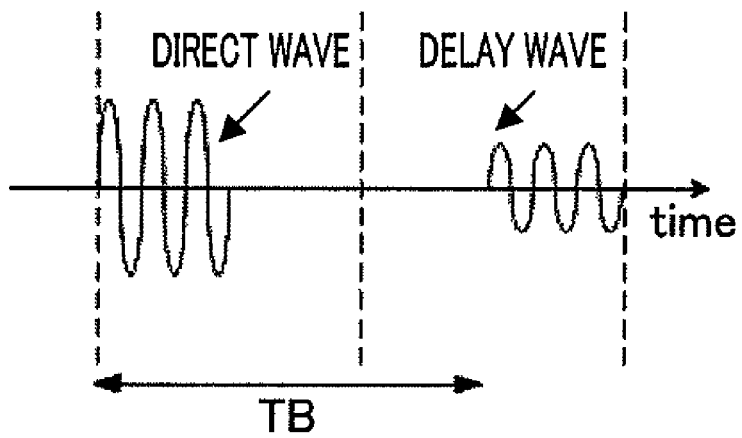
FIG.12C
FIG.12

COMMUNICATION APPARATUS AND COMMUNICATION METHOD

TECHNICAL FIELD

The present invention relates to a communication apparatus and a communication method. More particularly, the present invention relates to a communication apparatus and a communication method for setting a service area only in a specific area.

BACKGROUND ART

In recent years, in accordance with development of wireless techniques, usage of performing high-speed communication in a relatively small communication area such as radio LAN (Local Area Network) in addition to transmitting a small volume of content such as speech and email in a large communication area typified by mobile telephones, is spread.

Further, usage of using only a very limited location (that is, specific location) such as DSRC (Dedicated Short Range Communication) as a communication area, and that allows only users located in the specific location to communicate, is spread.

In the future, usage of downloading a large volume of content to a terminal a user carries or a terminal provided in a car, in a short period of time, is expected to be spread. However, such a large volume of content may include a large amount of personal information, and, if the content is image content such as movies, the content may be charged content.

Taking into consideration such a situation in the future, an increased demand for establishment of a communication system that enables high-speed large-volume communication positively with only communicating parties located in a specific location is expected.

FIG. 1 to FIG. 3 show conceptual diagrams illustrating a method for realizing a communication area of an ETC (Electronic Toll Correction System) as a conventional example of a communication system where communication is possible only with communicating parties located in a specific location. FIG. 1 to FIG. 3 show a case where vehicle 12-1 having first terminal 11-1 and vehicle 12-2 having second terminal 11-2 reach the vicinity of antenna 14 connected to radio section 13 of the communicating party.

As shown in FIG. 1, when service area AR1 of radio section 13 is made relatively large using antenna 14 with weak directivity, both first terminal 11-1 and second terminal 11-2 start communication with radio section 13, and cases occur where interference occurs, both terminals cannot communicate, or different terminals receive information data.

On the other hand, as shown in FIG. 2, when service area AR2 of radio section 13 is made relatively small, substantial communication time cannot be ensured when the moving speed of a vehicle is fast, and it is necessary to reduce the speed of the vehicle or bring the vehicle to a stop to ensure communication time.

To solve these problems, as shown in FIG. 3, Patent Document 1 discloses a technique of forming service area AR3 using first directivity and service area AR4 using second directivity by using a beam switching antenna as antenna 14. By this means, even if the moving speed of the vehicle is fast, terminals 11-1 and 11-2 can communicate without interference both in service areas AR3 and AR4.

Patent Document 1: Japanese Patent Application Laid-Open No. HEI11-185083

DISCLOSURE OF INVENTION

Problems to be Solved by the Invention

However, with the conventional configuration disclosed in Patent Document 1, it is necessary to provide a high directivity antenna to realize a small service area, and so there is a problem that an antenna becomes large. Further, although the service area is extended by switching directivity, it is necessary to perform automatic direction switching or phase combining using phase control in a carrier frequency band, which increases the size of the equipment to enable the equipment to move, and increases the cost. Further, to realize phase control with high accuracy, the cost of a controlling section becomes high.

It is therefore an object of the present invention to provide a communication apparatus and a communication method that allow only a terminal apparatus having a specific positional relationship with a communication apparatus to communicate, with a relatively simple configuration.

Means for Solving the Problem

To solve the above problems, the communication apparatus of the present invention includes: a first generating section that generates a first transmission signal based on an information data stream; a second generating section that generates a second transmission signal that enables demodulation of the information data stream by being combined with the first transmission signal at a specified timing; a first antenna that transmits the first transmission signal; a second antenna that transmits the second transmission signal; and an adjusting section that adjusts a transmission timing of at least one of the first transmission signal and the second transmission signal such that the first transmission signal and the second transmission signal arrive in a specific area at specified timings.

According to this configuration, the first transmission signal and the second transmission signal transmitted from the two antennas are made to arrive in the specific area at specified timings based on the arriving time difference between the time the first transmission signal transmitted from the first antenna arrives in the specific area and the time the second transmission signal transmitted from the second antenna arrives in the specific area, and so only communicating parties located in the specific area can demodulate an information data stream using the first transmission signal generated based on the information data stream and the second transmission signal, so that it is possible to limit the area where communication is possible to an extremely limited area with a relatively simple configuration.

Advantageous Effect of the Invention

According to the present invention, it is possible to provide a communication apparatus and a communication method that allow only terminal apparatuses having a specific positional relationship with a communication apparatus to communicate, with a relatively simple configuration.

BRIEF DESCRIPTION OF DRAWINGS

FIG. 12 shows arriving timings of a direct wave and a delay wave;

BEST MODE FOR CARRYING OUT THE INVENTION

The inventors of the present invention focus on the point that the area having a specific distant relationship with antennas of the communication apparatus having a plurality of antennas is limited to an extremely limited area (hereinafter "specific area"), and consider that, if a plurality of transmission signals from which an information data stream can be demodulated by combining at specified timings, for example, information data and a frame synchronization signal showing the frame timing of the information data, are transmitted so as to arrive at specified timings, only terminal apparatuses located in the specific area can communicate with a relatively simple configuration, and derive the present invention.

Embodiments of the present invention will be described in detail below with reference to the accompanying drawings.

(Embodiment 1)

Figure 1:
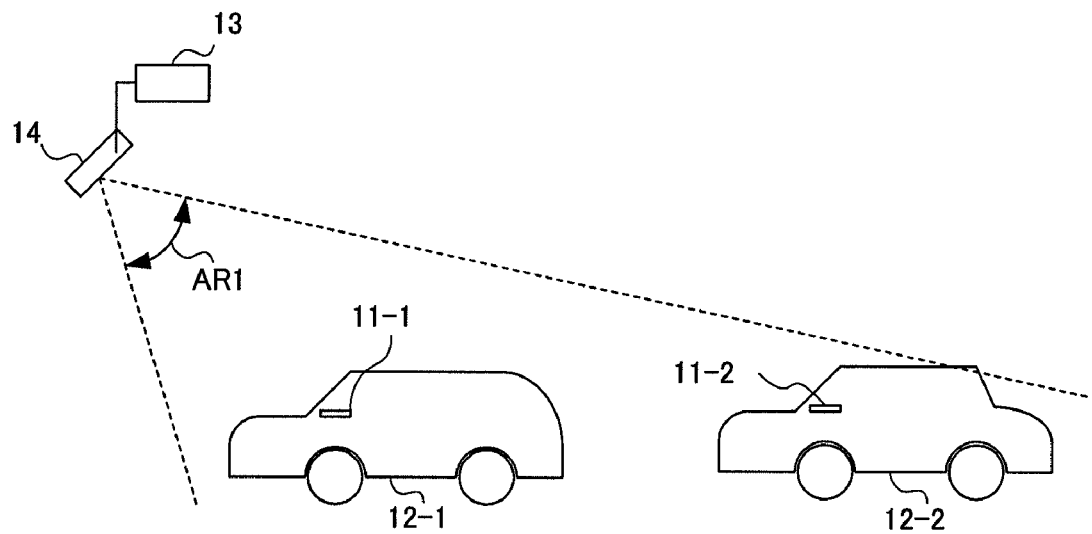
FIG. 1 illustrates a communication area of an ETC when a non-directivity antenna is used.
Figure 2:
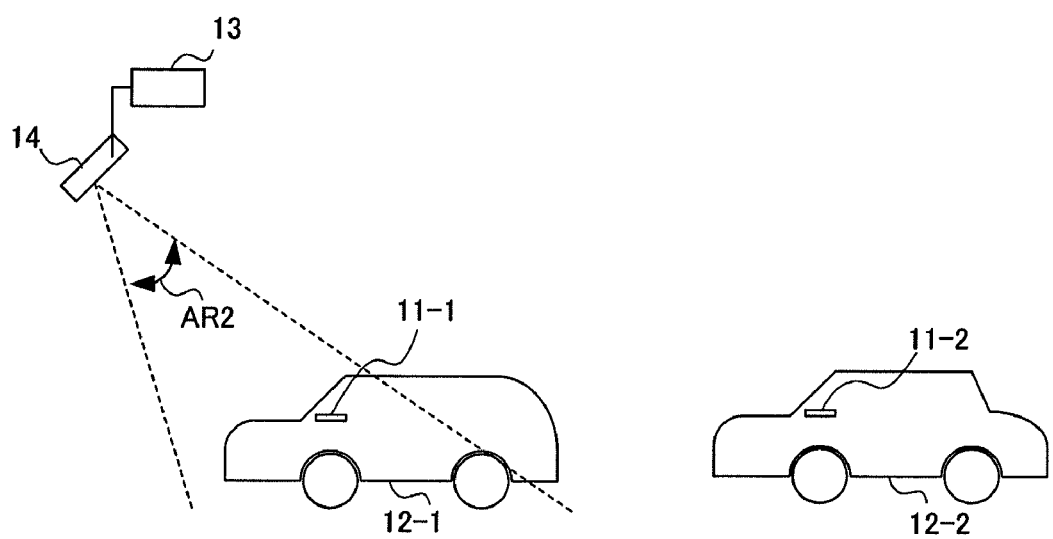
FIG. 2 illustrates a communication area of an ETC when a directivity antenna is used.
Figure 3:
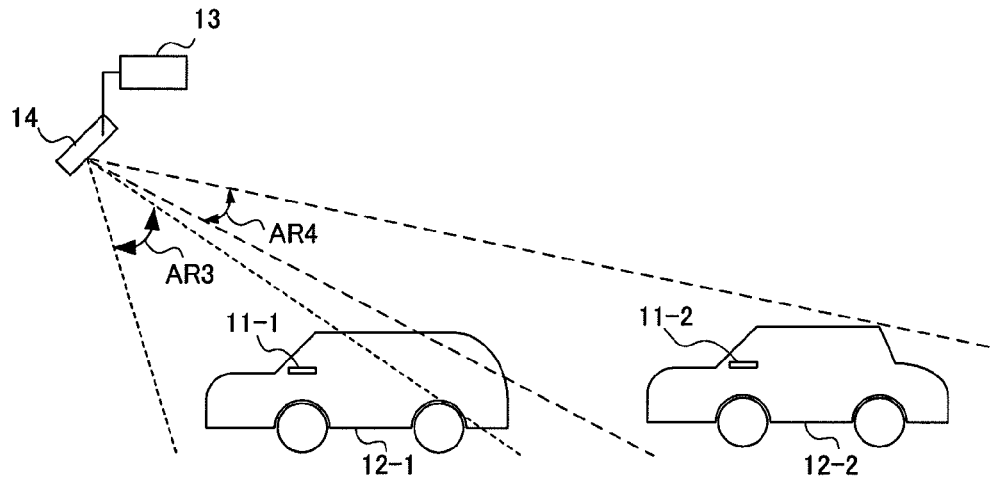
FIG. 3 illustrates a communication area of an ETC when a beam antenna is used.
Figure 4:
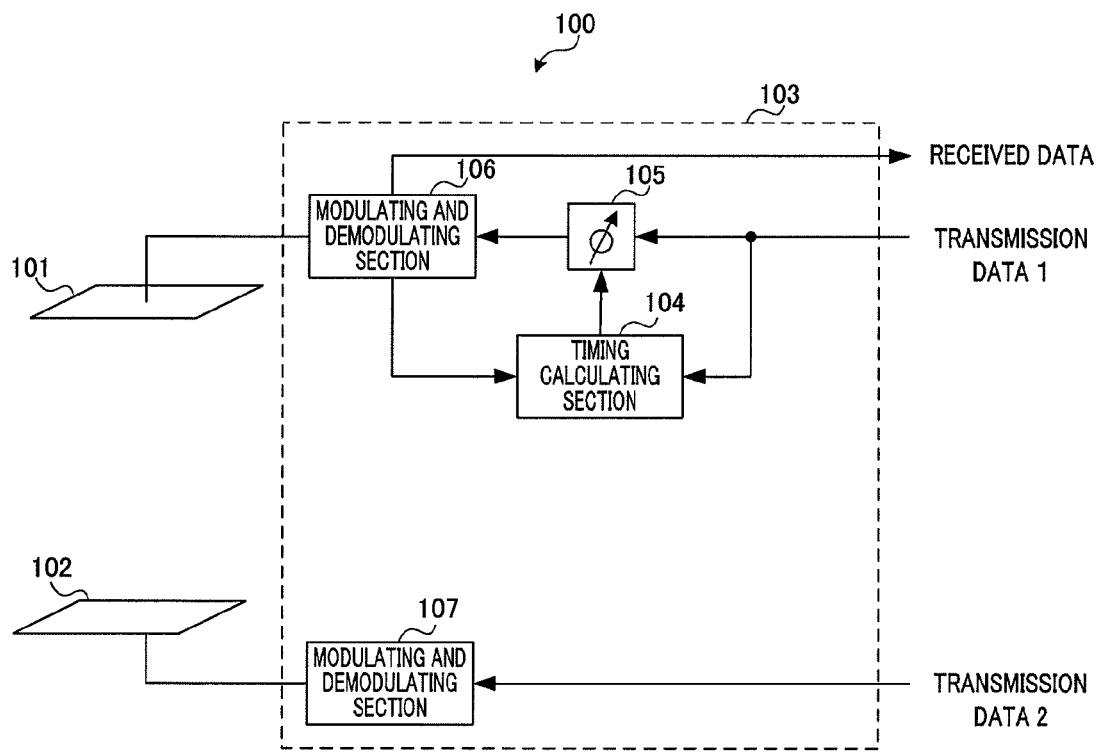
FIG. 4 is a block diagram showing the main configuration of the communication apparatus according to Embodiment 1 of the present invention.

FIG. 4 shows the main configuration of the communication apparatus according to Embodiment1 of the present invention. Communication apparatus 100 in FIG. 4 has first antenna 101, second antenna 102 and radio section 103, and, further, radio section 103 has timing calculating section 104, variable delayer 105, first modulating and demodulating section 106 and second modulating and demodulating section 107.

Figure 5:
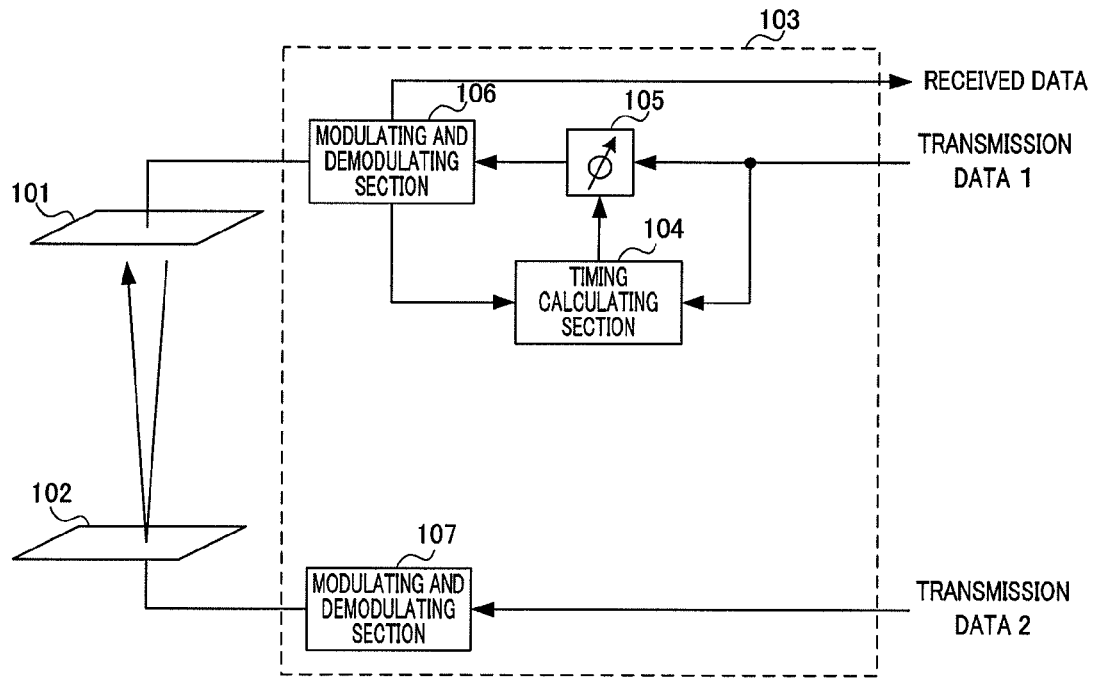
FIG. 5 shows a positional relationship between the communication apparatus according to Embodiment 1 and a terminal of a communicating party upon initial setting.
Figure 6:
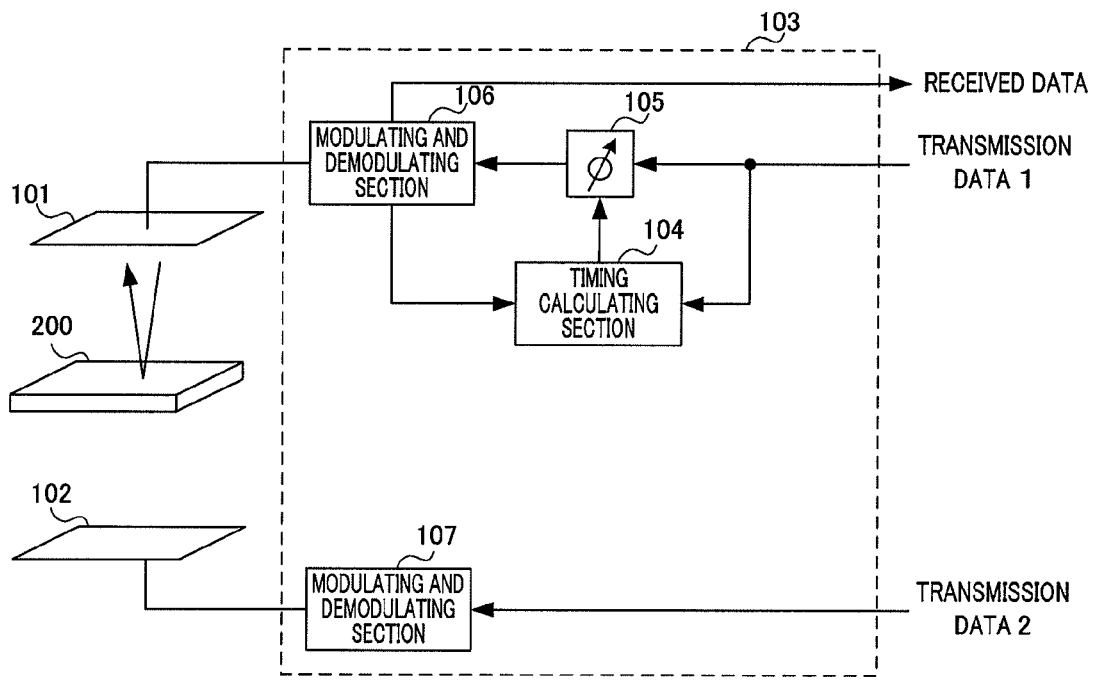
FIG. 6 shows a positional relationship between the communication apparatus according to Embodiment 1 and the terminal of the communicating party upon start of communication.
Figure 7:
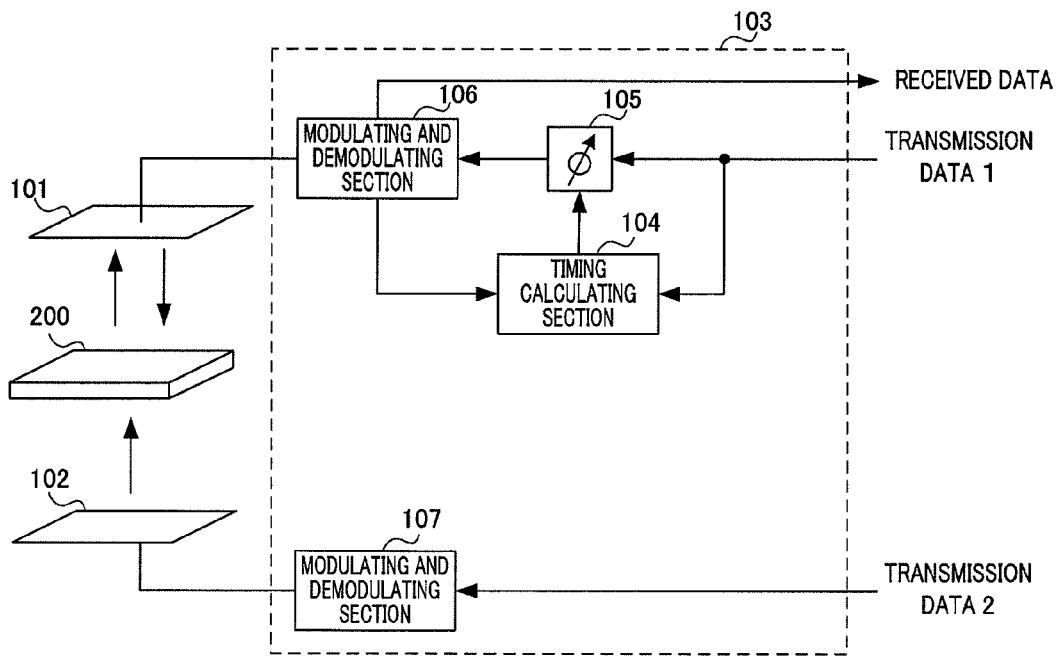
FIG. 7 shows a positional relationship between the communication apparatus according to Embodiment 1 and the terminal of the communicating party after communication is started.

FIG. 5, FIG. 6 and FIG. 7 show states of paths of signals transmitted from the respective antennas per communication state. FIG. 5 shows a state where a signal transmitted from antenna 101 is reflected by antenna 102 and received at antenna 101 upon initial setting. FIG. 6 shows a state where terminal 200 of the communicating party of communication apparatus 100 is provided between antenna 101 and antenna 102 and a transmission signal transmitted from antenna 101 is reflected by terminal 200 and received at antenna 101 upon start of communication. FIG. 7 shows a state where signals transmitted from antenna 101 and antenna 102 are received at terminal 200, and the transmission signal transmitted from terminal 200 is received at antenna 101 upon start of communication.

Antennas 101 and 102 each transmit transmission signals outputted from modulating and demodulating sections 106 and 107 to the other antenna or terminal 200 of the communicating party, and output the received signals arrived at antennas 101 and 102 to modulating and demodulating sections 106 and 107.

Upon initial setting or start of communication, timing calculating section 104 calculates a time difference equivalent to the difference between the path between antenna 101 and terminal 200 and the path between antenna 102 and terminal 200, from a transmission signal transmitted from antenna 101 and a reflected signal, which is the transmission signal that is reflected by antenna 102 or terminal 200 of the communicating party and returns to antenna 101. The method of calculating the time difference will be described in detail later. Further, timing calculating section 104 generates a timing adjusting signal from the calculated time difference and outputs the timing adjusting signal to variable delayer 105.

Variable delayer 105 delays the transmission timing of the transmission data according to the timing adjusting signal and outputs the delayed transmission data to modulating and demodulating section 106.

Modulating and demodulating sections 106 and 107 perform modulating processing on the transmission data after adjusting the timing and output the result to antennas 101 and 102. Further, modulating and demodulating sections 106 and 107 perform demodulating processing on the received signals and output the demodulated received data to timing calculating section 104. Although FIG. 7 shows a case where a transmission signal transmitted from terminal 200 is received at antenna 101 and modulating and demodulating section 106 performs demodulating processing, antenna 102 may receive the signal and modulating and demodulating section 107 may perform demodulating processing. Further, both antenna 101 and antenna 102 may receive the signal and both modulating and demodulating section 106 and modulating and demodulating section 107 may perform demodulating processing.

Figure 8:
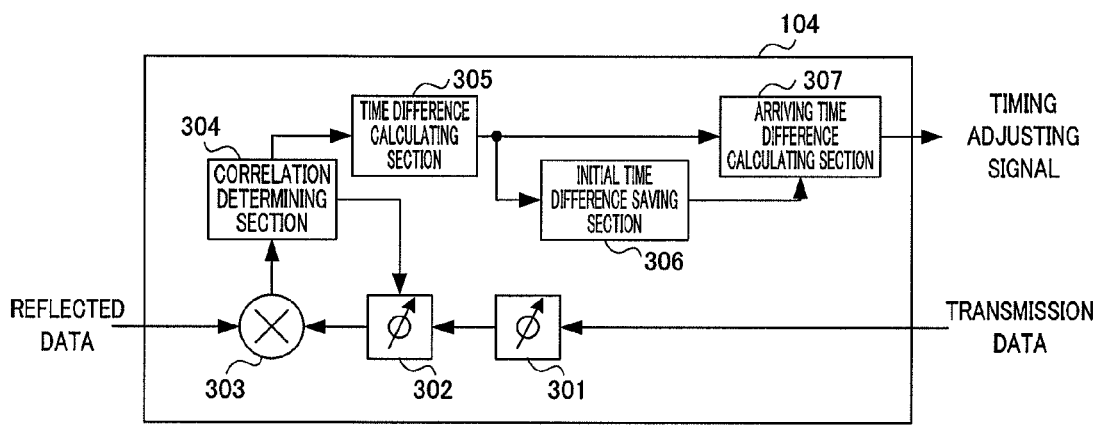
FIG. 8 is a block diagram of a timing calculating section according to Embodiment 1.

Next, timing calculating section 104 will be further described using FIG. 8. FIG. 8 is a block diagram showing the main configuration of timing calculating section 104. As shown in FIG. 8, timing calculating section 104 has first variable delayer 301, second variable delayer 302, correlator 303, correlation determining section 304, time difference calculating section 305, initial time difference saving section 306 and arriving time difference calculating section 307.

Variable delayer 301 delays transmission data by a delay time specific to the equipment. The delay time specific to the equipment specifically refers to a time equivalent to the path difference between the system to which antenna 101 is connected and the system to which antenna 102 is connected.

Variable delayer 302 delays transmission data outputted from variable delayer 301 according to the value of the control signal outputted from correlation determining section 304 and outputs the delayed transmission data to correlator 303.

Correlator 303 calculates the correlation between the transmission data outputted from variable delayer 302 and reflected data, which is the transmission data that is reflected by antenna 102 or terminal 200 and returns to antenna 101, and outputs the calculation result to correlation determining section 304.

Correlation determining section 304 calculates the delay amount between the transmission data and the reflected data using the correlation calculation result. To be more specific, correlation determining section 304 determines whether the correlation calculation result is equal to or greater than a predetermined threshold, and outputs control signals to variable delayer 302 until the correlation calculation result becomes equal to or greater than the threshold. Correlation determining section 304 determines the delay amount at variable delayer 302 according to the calculation result, and outputs a control signal that delays transmission data by the determined delay amount at variable delayer 302, to time difference calculating section 305.

Time difference calculating section 305 calculates the time the transmission data is delayed at variable delayer 302, that is, the time difference between the transmission data and the reflected data, from the control signal outputted from correlation determining section 304. For example, when correlation determining section 304 outputs a control signal having an amplitude level equivalent to the delay amount, time difference calculating section 305 accumulates the amplitude levels of the control signals and calculates a delay time at variable delayer 302.

Time difference calculating section 305 outputs the calculated time difference to initial time difference saving section 306 upon initial setting, and outputs the calculated time difference to arriving time difference calculating section 307 upon start of communication. The time difference calculated upon initial setting is the time it takes transmission data transmitted from antenna 101 to be reflected by antenna 102 and return to antenna 101 (hereinafter "initial time difference") Further, the time difference calculated upon start of communication is the time it takes transmission data transmitted from antenna 101 to be reflected by terminal 200 and return to antenna 101.

Initial time difference saving section 306 saves the initial time difference outputted from time difference calculating section 305 upon initial setting, and outputs the initial time difference to arriving time difference calculating section 307 upon start of communication.

Arriving time difference calculating section 307 outputs a timing adjusting signal for adjusting the transmission timing of the transmission data transmitted from antenna 101 at variable delayer 105 using the time difference outputted from time difference calculating section 305 upon start of communication, that is, the time it takes transmission data transmitted from antenna 101 to be reflected by terminal 200 and return to antenna 101, and the above-described initial time difference.

To be more specific, arriving time difference calculating section 307 delays transmission data transmitted from antenna 101 and outputs a timing adjusting signal equivalent to the delay amount that makes the transmission data transmitted from antenna 101 and transmission data transmitted from antenna 102 arrive at terminal 200 at specified timings. The delay amount can be calculated using, for example, next equation 1. In equation 1, T1 is the initial time difference, and T2 is the time it takes the transmission signal transmitted from antenna 101 to be reflected at terminal 200 and return to antenna 101.

$$\text{Delay amount} = T1/2 - T2 \qquad \text{(Equation 1)}$$

Figure 9:
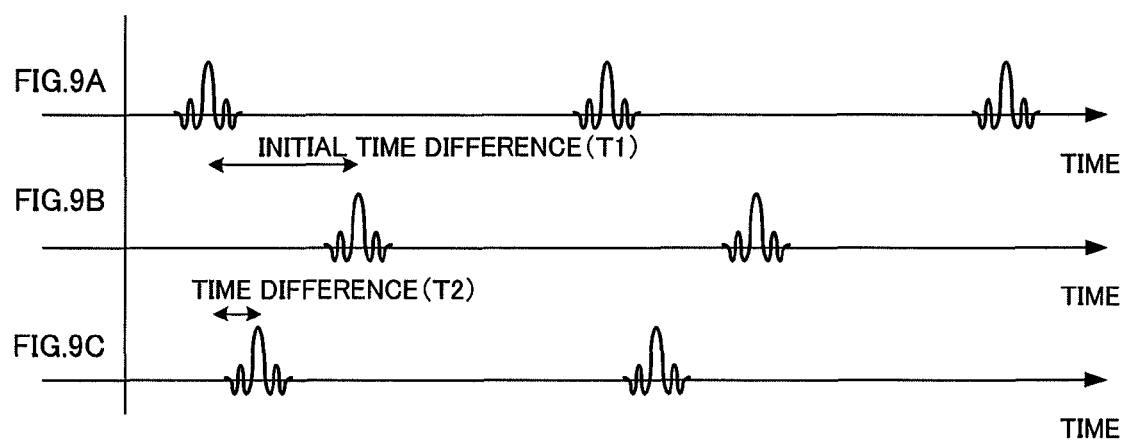
FIG. 9 shows a transmission timing of a first transmission signal, a timing at which the first transmission signal is reflected by a second antenna and returns to a first antenna, and a timing at which the first transmission signal is reflected by a terminal and returns to the first antenna.
Figure 10:
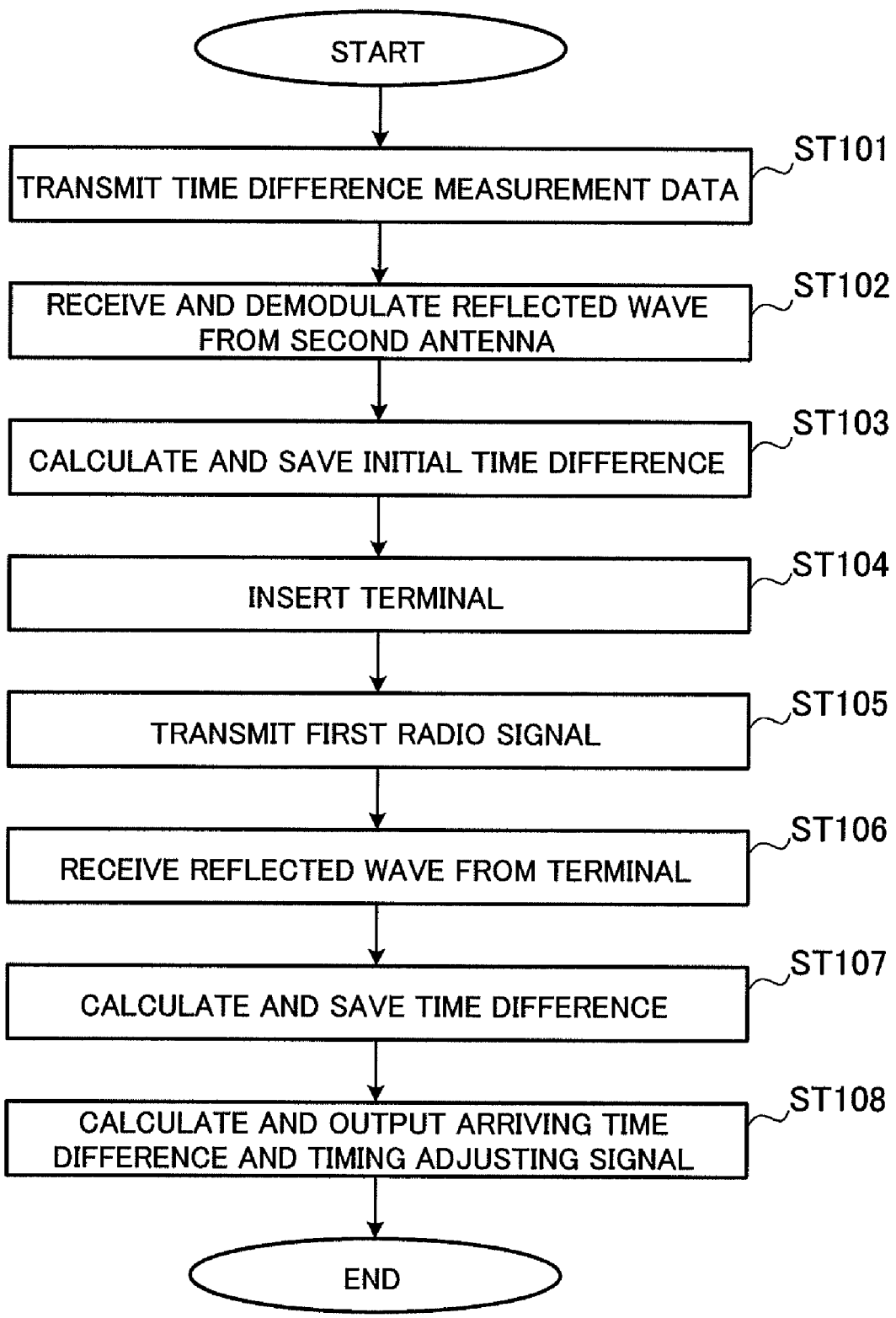
FIG. 10 is a flowchart illustrating a method for generating a timing adjusting signal according to Embodiment 1.

Next, the operation of communication apparatus 100 having the above-described configuration upon initial setting until start of communication will be described with reference to the waveform diagrams in FIG. 9A to FIG. 9C and the flowchart in FIG. 10.

First, upon initial setting, time difference measurement data for initial time difference measurement is transmitted to antenna 102 through variable delayer 105, modulating and demodulating section 106 and antenna 101 (ST101). As described above, the initial time difference is equivalent to the distance between antenna 101 and antenna 102. Upon initial setting, time difference measurement data is not delayed at variable delayer 105 and outputted to modulating and demodulating section 106.

The time difference measurement data reflected by antenna 102 is subjected to demodulating processing by modulating and demodulating section 106 through antenna 101 (ST102), and the demodulated reflected data is outputted to timing calculating section 104.

The initial time difference (T1) is calculated by timing calculating section 104 from a result of calculating correlation between the time difference measurement data and the reflected data reflected by antenna 102. To be more specific, the time difference measurement data is delayed by variable delayer 302 until the result of calculating correlation between the time difference measurement data and the reflected data at correlator 303 in timing calculating section 104 becomes equal to or greater than a predetermined threshold, the initial time difference is calculated by time difference calculating section 305 based on the delay amount at variable delayer 302, and the calculated initial time difference is saved in initial time difference saving section 306 (ST103). FIG. 9A shows transmission timings of the time difference measurement data, and FIG. 9B shows reception timings of the reflected data reflected by antenna 102.

Upon start of communication, terminal 200 is provided between antenna 101 and antenna 102 (ST104), and time difference measurement data is transmitted again to terminal 200 through variable delayer 105, modulating and demodulating section 106 and antenna 101 (ST105). In the same way as in the case of initial setting, the time difference measurement data is not delayed at variable delayer 105 and outputted to modulating and demodulating section 106.

The time difference measurement data reflected by terminal 200 is received by antenna 101 and subjected to demodulating processing by modulating and demodulating section 106 (ST106), and the demodulated reflected data is outputted to timing calculating section 104.

In the same way as in the case of initial setting, the time difference (T2) is calculated at timing calculating section 104 from the result of calculating correlation between the time difference measurement data and the reflected data from terminal 200, and the calculated time difference (T2) is saved at arriving time difference calculating section 307 (ST107). That is, the delay amount of delayer 302 when correlation is obtained is equivalent to the transmission period a radio wave is transmitted from antenna 101, reflected at terminal 200 and received again at antenna 101. FIG. 9C shows reception timings of reflected data reflected by terminal 200. In FIG. 9C, measurement is performed in the sate of FIG. 7.

The arriving time difference is calculated by arriving time difference calculating section 307 using, for example, the initial time difference (T1) and the time difference (T2) in above equation 1. That is, the arriving time difference due to the difference between the path of a first transmission signal transmitted from antenna 101 to terminal 200 and the path of a second transmission signal transmitted from antenna 102 to terminal 200, is calculated. Taking into account the arriving time difference, arriving time difference calculating section 307 further determines the delay amount at variable delayer 105 so that the first transmission signal and the second transmission signal arrive at terminal 200 at specified timings, and calculates a timing adjusting signal equivalent to the delay amount. The timing adjusting signal is outputted from arriving time difference calculating section 307 to variable delayer 105 (ST108).

In this way, the delay amount between transmission data 1 transmitted from antenna 101 and transmission data 2 transmitted from antenna 102 is determined, and after communication is started, variable delayer 105 adjusts the transmission timing of transmission data 1 according to the timing adjusting signal. Transmission data 1 for which the timing is adjusted and transmission data 2 are subjected to modulating processing by modulating and demodulating sections 106 and 107, and transmitted to terminal 200 through antennas 101 and 102.

By this means, transmission data 1 and transmission data 2 arrive at only terminal 200 at specified timings. On the other hand, transmission data 1 and transmission data 2 do not arrive at a terminal which does not have a specific positional relationship, at specified timings. Therefore, for example, when an information data stream is alternately allocated to transmission data 1 and transmission data 2 bit by bit and transmitted, the transmission data does not arrive at a terminal which does not have a specific positional relationship, at a specified timing, and so the information data stream cannot be demodulated correctly. However, the transmission data arrives at terminal 200 at specified timings, and so terminal 200 can demodulate the information data stream correctly.

As described above, according to this embodiment, a plurality of path differences between the antennas and the terminal are calculated from the time it takes the transmission signal transmitted from one of the antennas to be reflected by the other antenna and terminal 200 and return, and timings of transmission data transmitted from the antennas are adjusted such that the transmission signals arrive at terminal 200 at specified timings, so that only the terminal having a specific positional relationship with the antennas can demodulate the information data stream correctly.

Further, timings are adjusted at communication apparatus 100, and so terminals need not adjust timings, and only the terminal having a specific positional relationship with communication apparatus 100 can demodulate an information data stream without increasing processing load of the terminal.

That is, a signal can be demodulated automatically by simply combining the received signals for terminal 200 of an authorized receiver having a specific positional relationship with communication apparatus 100. By contrast with this, when an unauthorized receiver terminal acquires information improperly, the unauthorized receiver terminal does not have the above-described specific positional relationship and needs to adjust the timing of combining different signals transmitted separately from antenna 101 and antenna 102, and so cannot demodulate an information data stream in a simple manner. Further, communication apparatus 100 changes timings or combination of signals transmitted from antenna 101 and antenna 102 at appropriate intervals, and thereby the terminal of the unauthorized receiver needs to adjust the combining timing every time the timings and combination of signals transmitted from antenna 101 and antenna 102 change, and so communication apparatus 100 has an effect of enhancing security that prevents information from being improperly acquired in a simple manner.

In this way, by making transmission data 1 and transmission data 2 transmitted from antenna 101 and antenna 102 different so that information data streams can be demodulated by complementing transmission data 1 and transmission data 2 with each other, only the terminal having a specific positional relationship with communication apparatus 100 can demodulate an information data stream correctly.

By measuring the time difference (T2) at predetermined time intervals, it is possible to correct the time difference when the position of the communicating party changes.

Although a case has been described with the above description where time differences equivalent to the path differences between the antennas and terminal 200 are calculated and timings are adjusted based on the time differences equivalent to the path differences, the present invention can be implemented in the same way by determining the position of terminal 200 in advance, adopting a configuration for fixing the position to place terminal 200 by limiting the position without calculating time differences equivalent to the path differences, and adjusting timings according to the positions. Further, the specific positional relationship between the antennas and terminal 200 may be changed temporally and the positional relationship where communication is possible may be limited by providing a plurality of candidates for the position to place terminal 200 and changing the position per user, or by changing the position by encouraging the user to change the position using a command for changing the position even for one user, or, for example, by changing the position by providing a function of changing the position to the apparatus holding terminal 200.

Frequency bands of signals transmitted from antennas 101 and 102 need not be the same frequency band particularly and may be different frequency bands. That is, for example, antenna 101 transmits a signal of a 60 GHz band, and antenna 102 transmits a signal of a 3 to 5 GHz band, and, by using a propagation attenuation difference caused by the difference between frequency bands, wideband communication using a millimeter wave band and communication with few errors using a microwave band may be used in combination. By this means, information that has a relatively small amount of data and that needs to be transmitted reliably, such as authentication data which needs to be transmitted between terminal 200 and communication apparatus 100 before communication is started, is transmitted using a microwave band with few errors, and, after authentication and the like is established once, information data may be transmitted at high speed using a millimeter wave band, which is suitable for high-capacity transmission.

Further, by transmitting the above-described time difference measurement data to the other antenna using a microwave band of a 3 to 5 GHz band alone upon initial setting and start of communication and calculating an arriving time difference, the arriving time becomes longer than in the case where the arriving time difference is calculated using a millimeter wave band, so that it is possible to calculate the arriving time difference between a terminal closer to communication apparatus 100 and communication apparatus 100, and adjust a timing of communication with a terminal located at a short distance from communication apparatus 100. Frequency conversion may be, for example, performed by a frequency converting section configured with a local signal source and a mixer.

As described above, although a case has been described with this embodiment where direct waves of transmission data 1 and transmission data 2 transmitted from antennas 101 and 102 arrive at terminal 200 at specified timings, communication apparatus 100 may further have multipath measuring section 108 that measures the propagation delay time of a delay wave caused by the influence of multipath, and may select an antenna for transmitting transmission data so as to prevent intersymbol interference due to the delay wave.

Figure 11:
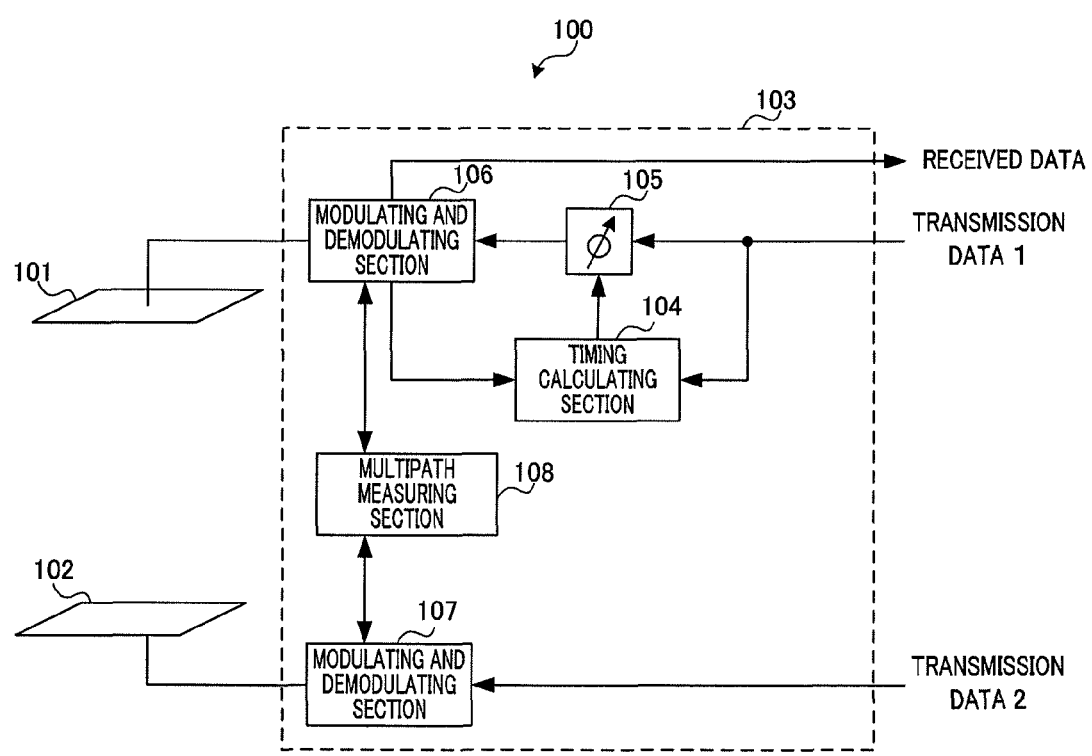
FIG. 11 is a block diagram showing the main configuration of the communication apparatus according to Embodiment 1.

FIG. 11 shows the main configuration of communication apparatus 100 having multipath measuring section 108. Multipath measuring section 108, for example, calculates the difference between a known signal and an actual received signal outputted from modulating and demodulating section 106 or modulating and demodulating section 107, and measures the propagation delay time of a delay wave caused by the influence of multipath. Multipath measuring section 108 outputs the propagation delay time to modulating and demodulating sections 106 and 107.

Figure 13:
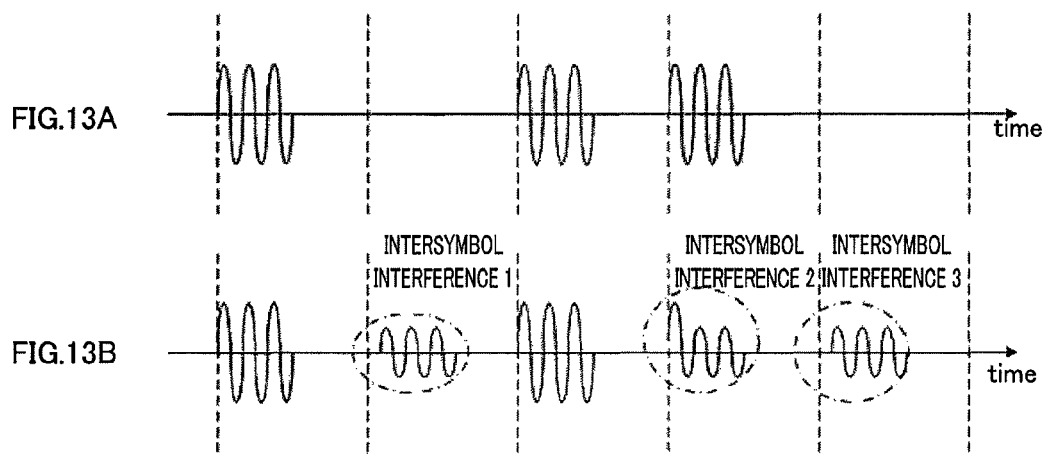
FIG. 13 illustrates intersymbol interference due to a delay wave.

The operation of communication apparatus 100 configured as described above will be described below with reference to FIG. 12 to FIG. 14. A case of the OOK (On Off Keying) modulation scheme will be described in the following description where, when transmission data is "1," a transmission wave is transmitted, and, when transmission data is "0," a transmission wave is not transmitted.

FIG. 12B shows the relationship between the timing at which the direct wave of a transmission wave arrives at terminal 200 and the timing at which a delay wave of the transmission wave caused by the influence of multipath between antenna 101 and terminal 200 arrives at terminal 200, when the transmission wave shown in FIG. 12A is transmitted from antenna 101 to terminal 200. In the example shown in FIG. 12B, the delay wave arrives at terminal 200 after delay time TA with respect to the direct wave.

In the same way, FIG. 12C shows the relationship between the timing at which the direct wave of a transmission wave arrives at terminal 200 and the timing at which a delay wave of the transmission wave delayed by the influence of multipath between antenna 102 and terminal 200 arrives at terminal 200, when the transmission wave shown in FIG. 12A is transmitted from antenna 102 to terminal 200. In the example shown in FIG. 12C, the delay wave arrives at terminal 200 after delay time TB with respect to the direct wave.

Multipath measuring section 108 measures these delay times TA and TB. Further, multipath measuring section 108 distributes the "1's" included in transmission data to either transmission data 1 to be transmitted from antenna 101 or transmission data 2 to be transmitted from antenna 102, taking into consideration delay times TA and TB. The method of distributing transmission data will be described below taking a case as an example where transmission data is comprised of "1," "0," "1," "1" and "0."

First, as shown in FIG. 13A, a case will be described where a transmission signal stream matching the above-described transmission data is transmitted from only antenna 101. As shown in FIG. 13B, a delay wave influenced by multipath between antenna 101 and terminal 200 (intersymbol interference 1 to 3) in addition to the direct wave, arrives at terminal 200.

In FIG. 13B, as a result of combining the direct wave and the delay wave, the phase of intersymbol interference 2 is canceled and the amplitude becomes small. Therefore, in the case of the OOK modulation scheme where received data is determined to be "1" when the amplitude is equal to or higher than a predetermined threshold, the amplitude of intersymbol interference 2 is lower than the predetermined threshold, and so intersymbol interference 2 is more likely to be determined to be "0," which leads to communication errors.

Figure 14:
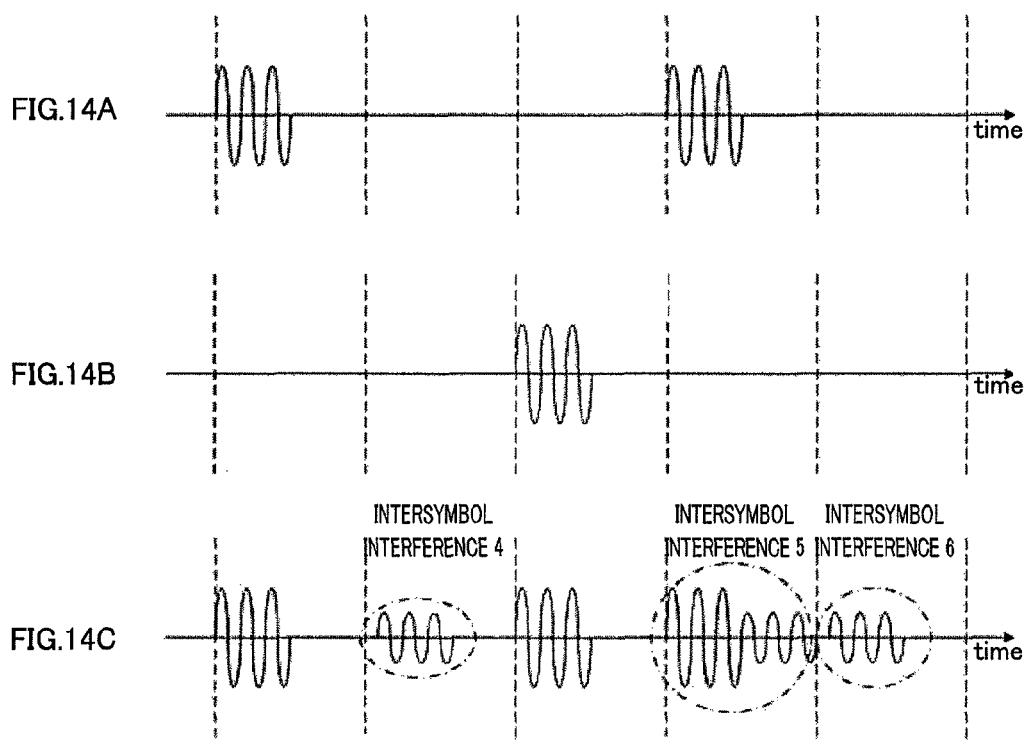
FIG. 14 illustrates a timing adjusting method for avoiding intersymbol interference due to a delay wave.

By contrast with this, FIG. 14 shows a state of transmission waves transmitted from antennas 101 and 102, and a direct wave and a delay wave that arrive at terminal 200, when multipath measuring section 108 transmits part of the "1's" included in transmission data from the other antenna 102. To be more specific, FIG. 14A shows a transmission wave transmitted from antenna 101, and FIG. 14B shows a transmission wave transmitted from antenna 102. Further, FIG. 14C shows a state of the direct wave and a delay wave that arrive at terminal 200. As shown in FIG. 14A and FIG. 14B, when transmission data includes "1's" part of the transmission data is transmitted from antenna 102, and so intersymbol interference 4 and intersymbol interference 6 arriving at terminal 200 are the same as intersymbol interference 1 and intersymbol interference 3 shown in FIG. 13B, and the amplitude of intersymbol interference 5 becomes equal to or higher than a predetermined threshold without attenuating, and is determined to be "1" correctly, so that it is possible to make determination errors less likely compared to intersymbol interference 2 shown in FIG. 13B.

In this way, the "1's" included in transmission data are distributed to transmission data 1 transmitted from antenna 101 or transmission data 2 transmitted from antenna 102 taking into consideration the delay time of a delay wave caused by the influence of multipath, so that the antenna that transmits the transmission wave can be switched. As a result, the direct wave and the delay wave are less likely to arrive at terminal 200 with different phases, and demodulation errors due to intersymbol interference can be reduced.

Although a case has been described with the above description where the direct wave and a delay wave of a transmission wave transmitted from antenna 101 arrive at the timing at which the direct wave and the delay wave cancel out each other, and so, when transmission data includes "1's" part of the "1's" is transmitted from antenna 102 and the direct wave and the delay wave arrive at timings at which the direct wave and the delay wave do not overlap with each other, it is also possible to use antenna 101 positively as the antenna transmitting transmission data "1's" when the direct wave and the delay wave of the transmission wave transmitted from antenna 101 arrive at terminal 200 in the same phase. By this means, as a result of the direct wave and the delay wave arriving at terminal 200 in the same phase and combined in the same phase, the amplitude increases, and thereby the same effect as Rake combining can be obtained, and it is possible to improve the SNR (Signal to Noise Ratio) and improve demodulation performance.

(Embodiment 2)

Figure 15:
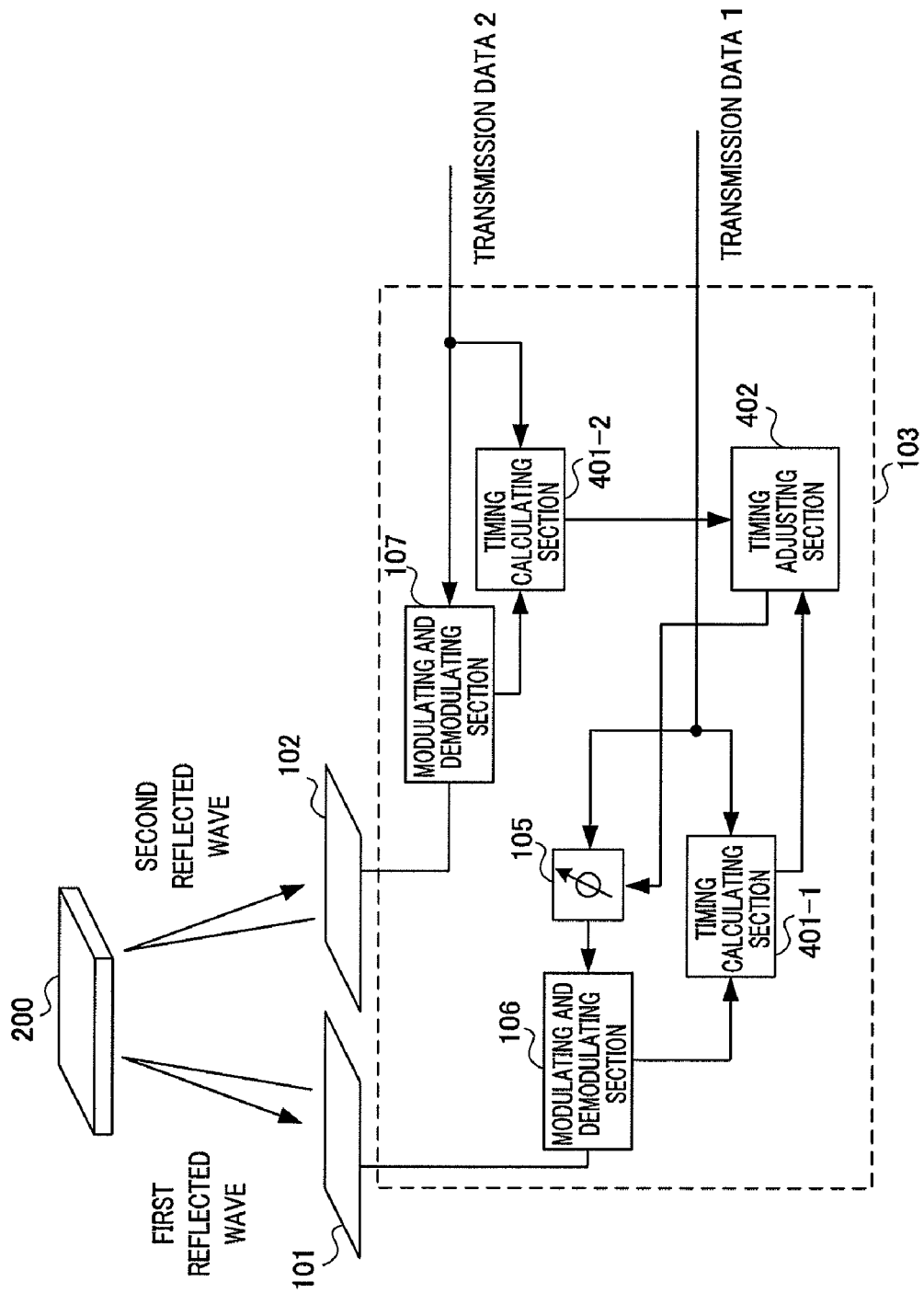
FIG. 15 is a block diagram showing the main configuration of the communication apparatus according to Embodiment 2 of the present invention.

FIG. 15 shows the main configuration of communication apparatus 100 according to an embodiment of the present invention. The main configuration of communication apparatus 100 is the same as the communication apparatus in FIG. 4 described in above Embodiment1 except that antenna 101 and antenna 102 are arranged in parallel, terminal 200 is arranged over the antennas, timing calculating sections 401-1 and 401-2 are provided instead of timing calculating section 104, and timing adjusting section 402 is added.

Timing calculating sections 401-1 and 401-2 adopt configurations that remove initial time difference saving section 306 and arriving time difference calculating section 307 from the main configuration of timing calculating section 104 shown in FIG. 8, and calculate time differences equivalent to the path differences between the respective antennas and terminal 200 from reflected signals, which are transmission signals transmitted from the antennas and returned by terminal 200, and output the calculated time differences to timing adjusting section 402. That is, timing calculating section 401-1 calculates a time difference equivalent to the path difference between antenna 101 and terminal 200, and timing calculating section 401-2 calculates a time difference equivalent to the path difference between antenna 102 and terminal 200.

Timing adjusting section 402 generates a timing adjusting signal for adjusting the transmission timing of a transmission signal transmitted from antenna 101 so that transmission signals transmitted from antenna 101 and antenna 102 arrive at terminal 200 at specified timings, from the time differences equivalent to the path differences outputted from timing calculating sections 401-1 and 401-2. Timing adjusting section 402 outputs the generated timing adjusting signal to variable delayer 105. That is, from the time it takes signals to be transmitted from antenna 101 and antenna 102, reflected by terminal 200 and arrive at the respective antennas, a transmission timing of transmission data transmitted from antenna 101 is adjusted. By this means, transmission signals transmitted from antenna 101 and antenna 102 arrive at terminal 200, which is located in a specific area, at specified timings, and only terminal 200 can perform communication.

As described above, according to this embodiment, time differences equivalent to the path differences between the path between antenna 101 and terminal 200 and the path between antenna 102 and terminal 200 are calculated, the arriving time difference between transmission signals transmitted from the respective antennas is calculated and a delay amount is determined, so that, even in a state where terminal 200 cannot be provided between antenna 101 and antenna 102, by making transmission data arrive at terminal 200 at a specified timing, it is possible to demodulate an information data stream and ease restrictions on settings of antennas 101 and 102 and terminal 200, compared to Embodiment 1.

Figure 16:
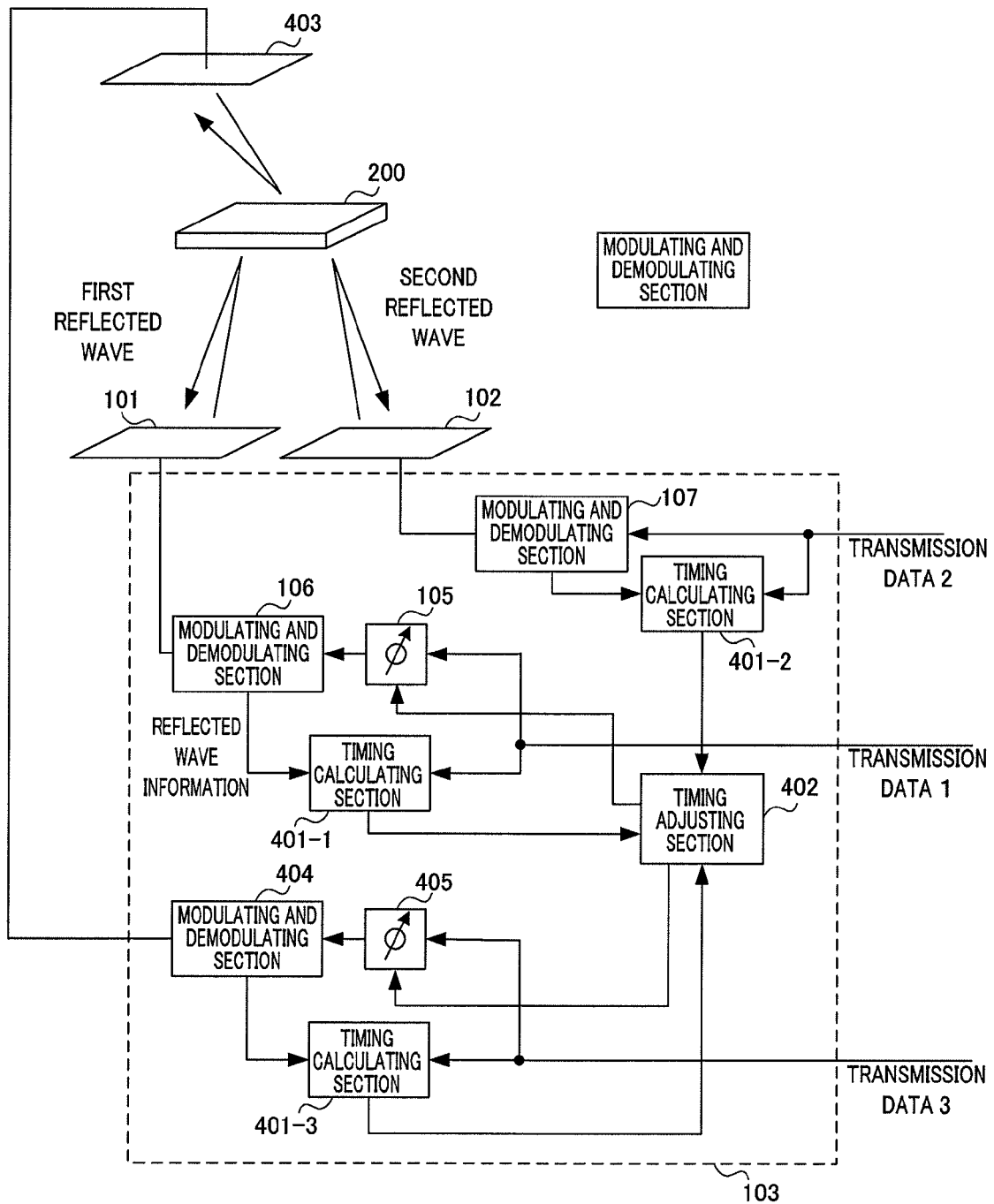
FIG. 16 is a block diagram showing the main configuration of the communication apparatus according to Embodiment 2.

Although a case has been described as an example with the above embodiment where a communication apparatus has two antennas, the number of antennas is not limited to two, and three or more antennas, modulating and demodulating sections and timing adjusting calculating sections may be provided according to the number of antennas. FIG. 16 shows the main configuration of a communication apparatus having three antennas. FIG. 16 shows a configuration for adding third antenna 403, third modulating and demodulating section 404, third timing calculating section 401-3 and second variable delayer 405 to FIG. 15. When the number of antennas is increased to three, the time difference is calculated using transmission data transmitted from the three antennas, and so only the terminal located at a specific distance from all the antennas can demodulate an information data stream correctly, and a specific area where communication is possible can be narrowed down to a further limited area.

(Embodiment 3)

Figure 17:
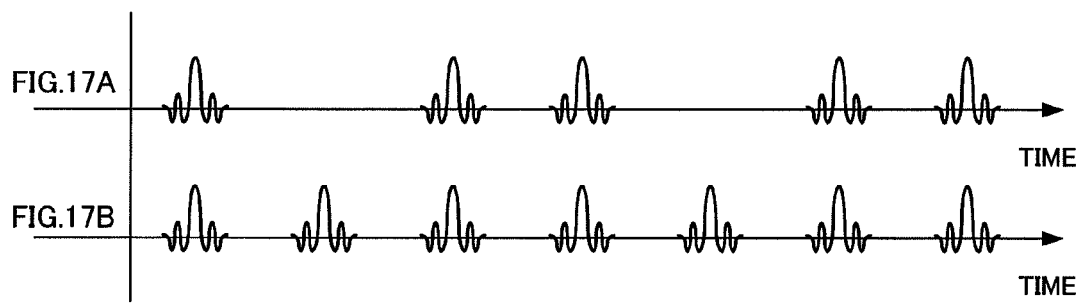
FIG. 17 shows timings of first and second transmission signals according to Embodiment 3 of the present invention.

In Embodiment3 of the present invention, a terminal that receives a signal transmitted from a communication apparatus of Embodiments1 and 2 will be described. As an example, terminal 200 that receives a pulse signal transmitted from the communication apparatus of Embodiments 1and 2 will be described. FIG. 17A shows the transmission timing of a first transmission signal transmitted from communication apparatus 100, and FIG. 17B shows the transmission timing of a second transmission signal transmitted from communication apparatus 100. The first transmission signal (FIG. 17A) and the second transmission signal (FIG. 17B) transmitted from communication apparatus 100 arrive at terminal 200 at timings shown in FIG. 17. In this embodiment, the first transmission signal is a modulated pulse signal, and, for example, in the case of the OOK (On Off Keying) modulation scheme, shows "1" when there is a pulse, and shows "0" when there is no pulse. On the other hand, the second transmission signal is a timing signal, and, for example, includes a synchronization clock. That is, by combining the first transmission signal, which is an information data stream, and the second transmission signal including a synchronization clock, data can be demodulated correctly.

Figure 18:
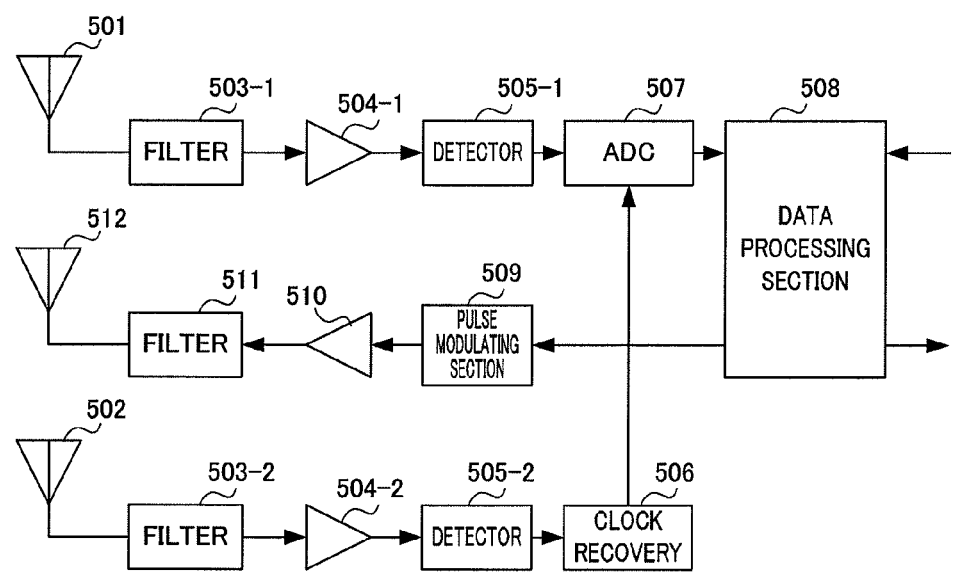
FIG. 18 is a block diagram showing the main configuration of the terminal according to Embodiment 3.

FIG. 18 shows the main configuration of terminal 200 that receives a pulse signal as shown in FIG. 17. Terminal 200 shown in FIG. 18 has antennas 501, 502 and 512, filters 503-1, 503-2 and 511, amplifiers 504-1, 504-2 and 510, detectors 505-1 and 505-2, clock recovery 506, ADC (Analog to Digital Converter) 507, data processing section 508 and pulse modulating section 509.

Antennas 501 and 502 receive first and second transmission signals transmitted from communication apparatus 100. Filters 503-1, 503-2 and 511 perform band limitation on received signals or transmission signals. Amplifiers 504-1, 504-2 and 510 adjust the amplitude levels of the received signals or the transmission signals. Detectors 505-1 and 505-2 perform envelope detection on the received signals, detector 505-1 outputs an envelope detection result to ADC 507, and detector 505-2 outputs an envelope detection result to clock recovery 506.

Clock recovery 506 generates a timing signal for the received signal from the envelope detection result and outputs the timing signal to ADC 507. ADC 507 samples the received signal using the timing signal. Data processing section 508 performs demodulating processing on the sampled received signal.

To be more specific, the received signal includes a pulse signal transmitted from communication apparatus 100 as a first transmission signal and a timing signal transmitted as a second transmission signal, and so data processing section 508 performs demodulating processing on the received signal after removing the clock signal from the sampled received signal. When the first transmission signal and the second transmission signal are transmitted from communication apparatus 100 in different carrier frequency bands, filters 503-1 and 503-2 are subjected to band limitation, and so data processing section 508 may perform demodulating processing on the sampled received signal directly.

There may be a case where, in addition to the direct waves of a first transmission signal and second transmission signal transmitted from communication apparatus 100, reflected waves are mixed and arrive at terminal 200. However, the direct wave and reflected waves rarely arrive at terminal 200 at the same timing, a millimeter wave has large propagation attenuation, and a signal power difference between the direct wave and the reflected waves is significant, so that data processing section 508 can separate the direct wave and reflected waves.

Further, data processing section 508 outputs transmission data to pulse modulating section 509 and performs digital demodulating processing on sampling data outputted from ADC 507. Pulse modulating section 509 performs pulse modulating processing on transmission data and outputs the result to amplifier 510. Antenna 512 transmits the transmission signal that has passed through amplifier 510 and filter 511 after pulse modulation, to communication apparatus 100.

Next, the reception operation of terminal 200 configured as described above will be described.

The first transmission signal transmitted from antenna 101 of communication apparatus 100 is received through antenna 501 (hereinafter "first received signal"), passes through filter 503-1 and amplifier 504-1, and is envelope-detected by detector 505-1, and the detection result is outputted to ADC 507.

On the other hand, the second transmission signal transmitted from antenna 102 of communication apparatus 100 is received through antenna 502 (hereinafter "second received signal"), passes through filter 503-2 and amplifier 504-2, and is envelope-detected by detector 505-2, and the detection result is outputted to clock recovery 506.

Clock recovery 506 generates a timing signal from the second received signal after envelope detection.

As described above, in this embodiment, the second transmission signal transmitted from antenna 102 includes a synchronization clock, and so clock recovery 506 can generate a timing signal. The first received signal after envelope detection is sampled by ADC 507 using a timing signal, and the sampled first received signal is subjected to digital demodulating processing by data processing section 508.

Although a case has been described with FIG. 17 where the second transmission signal exists at all timings at which the first transmission signal may exist, clock recovery 506 may generate a timing signal by multiplying a low frequency signal. By this means, a signal with a long pulse repetition period can be used as a second transmission signal.

Figure 19:
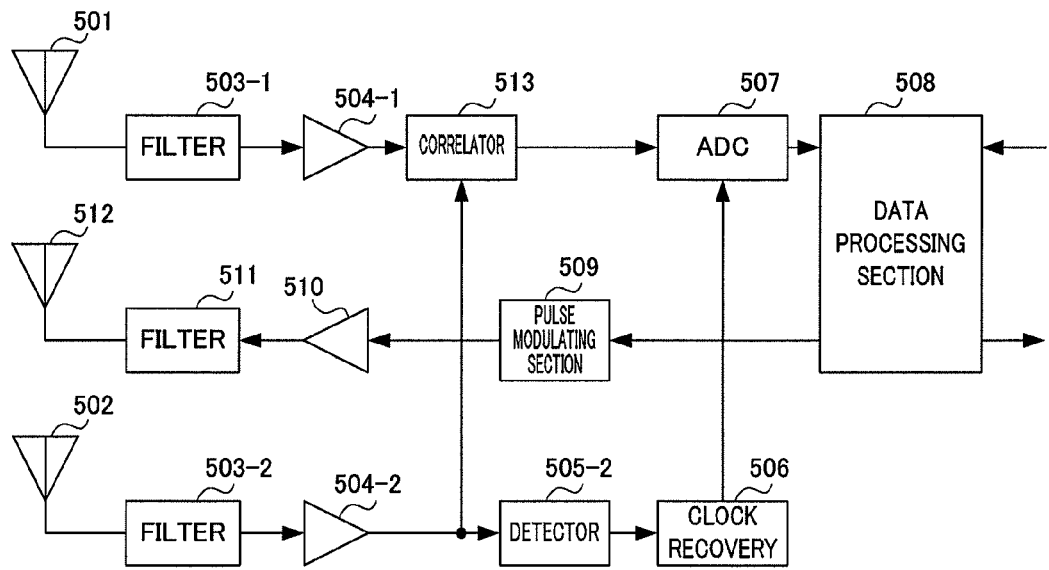
FIG. 19 is a block diagram showing the main configuration of the terminal according to Embodiment 3.

Further, FIG. 19 shows another configuration example of terminal 200 that receives a pulse signal shown in FIG. 17. FIG. 19 shows a configuration including correlator 513 instead of detector 505-1, and correlator 513 performs synchronization detection instead of envelope detection. By this means, it is possible to generate a timing signal at higher accuracy and improve demodulation performance.

Figure 20:
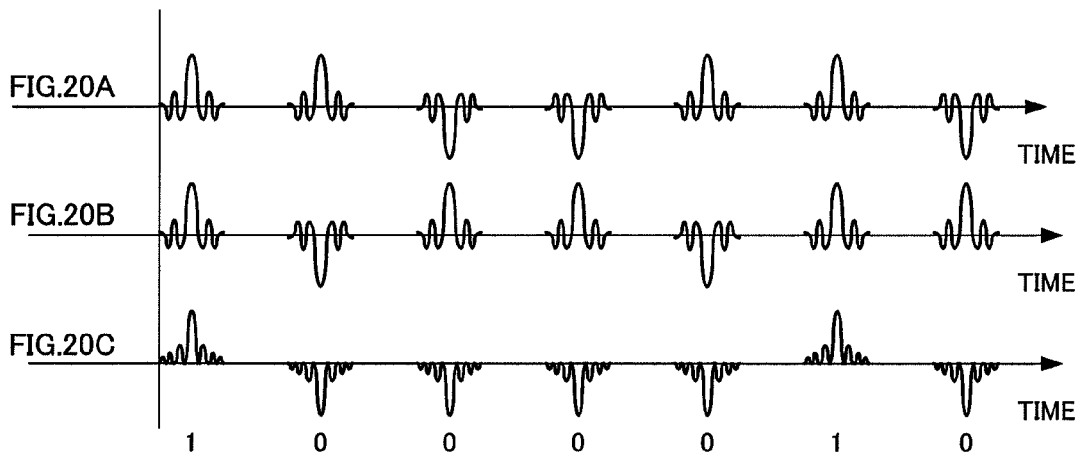
FIG. 20 shows the timings of first and second transmission signals and a result of correlation between the first and second transmission signals according to Embodiment 3.

FIG. 20 shows another example of a pulse signal transmitted from a communication apparatus in Embodiments 1 and 2. A first transmission signal (FIG. 20A) and a second transmission signal (FIG. 20B) are pulse signals subjected to BPSK (Binary Phase Shift Keying) modulation, and the pulse signals arrive at terminal 200 at the same timing.

When terminal 200 has the main configuration as shown in FIG. 19, the output of correlator 513 has a waveform where the first transmission signal and the second transmission signal are combined by multiplying as shown in FIG. 20C, and data processing section 508 determines "1" when the output result is positive and determines "0" when the output result is negative.

Figure 21:
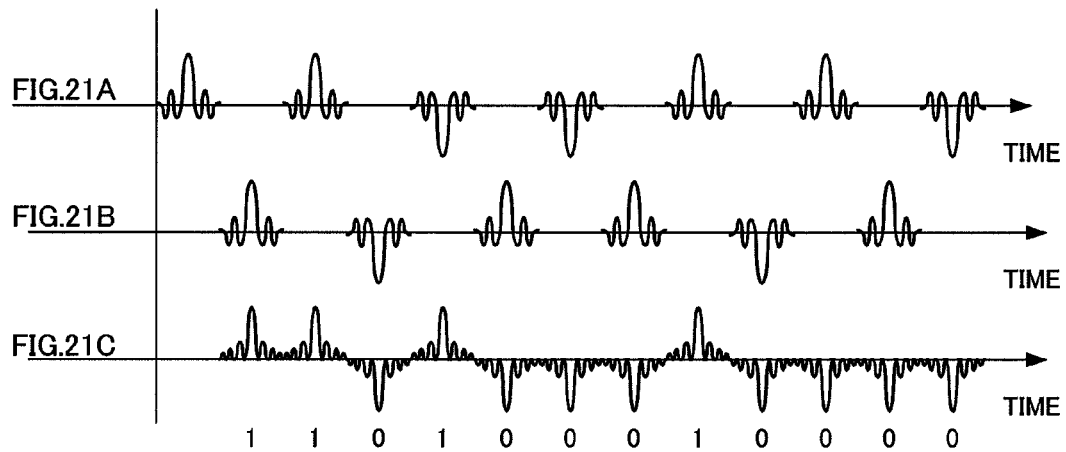
FIG. 21 shows the timings of the first and second transmission signals and a result of correlation between the first and second transmission signals according to Embodiment 3.
Figure 22:
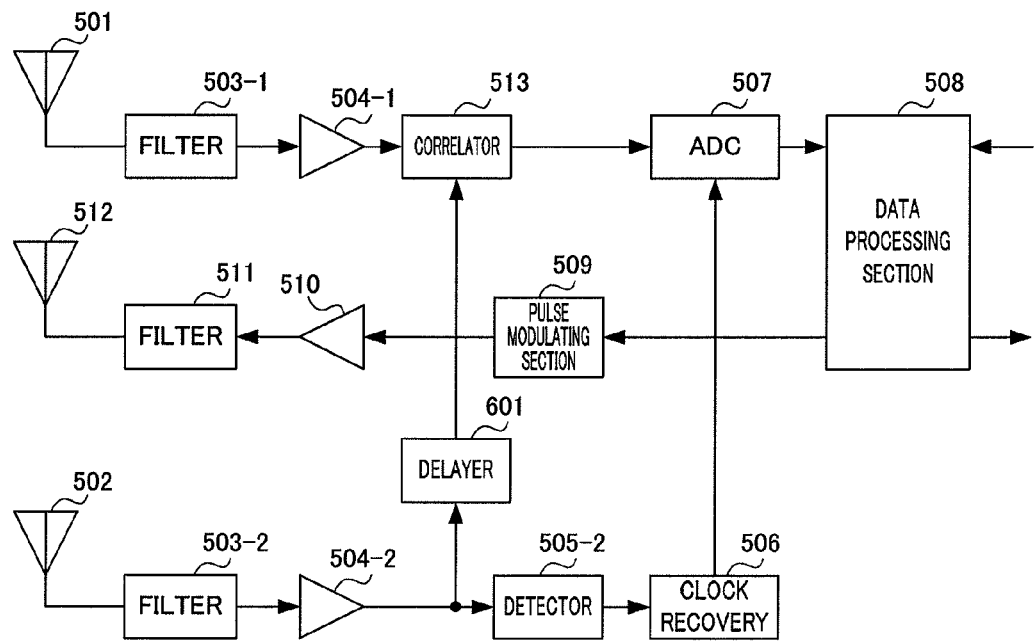
FIG. 22 is a block diagram showing the main configuration of the terminal according to Embodiment 3.

When the first transmission signal (FIG. 21A) and the second transmission signal (FIG. 21B) transmitted from the communication apparatus of Embodiments 1 and 2 are transmitted at timings shown in FIG. 21, the transmission signals can be demodulated at terminal 200 having the main configuration as shown in FIG. 22. FIG. 22 has a configuration adding delayer 601 to FIG. 19. That is, when the first transmission signal and the second transmission signal do not arrive at the same timing, timings are adjusted by delaying the first transmission signal at delayer 601, and the delayed first transmission signal and the second transmission signal are subjected to correlation calculation by correlator 513.

Delayer 601 measures arriving timings every time the delay amount changes and adjusts the timings until the arriving timings become the same.

Figure 23:
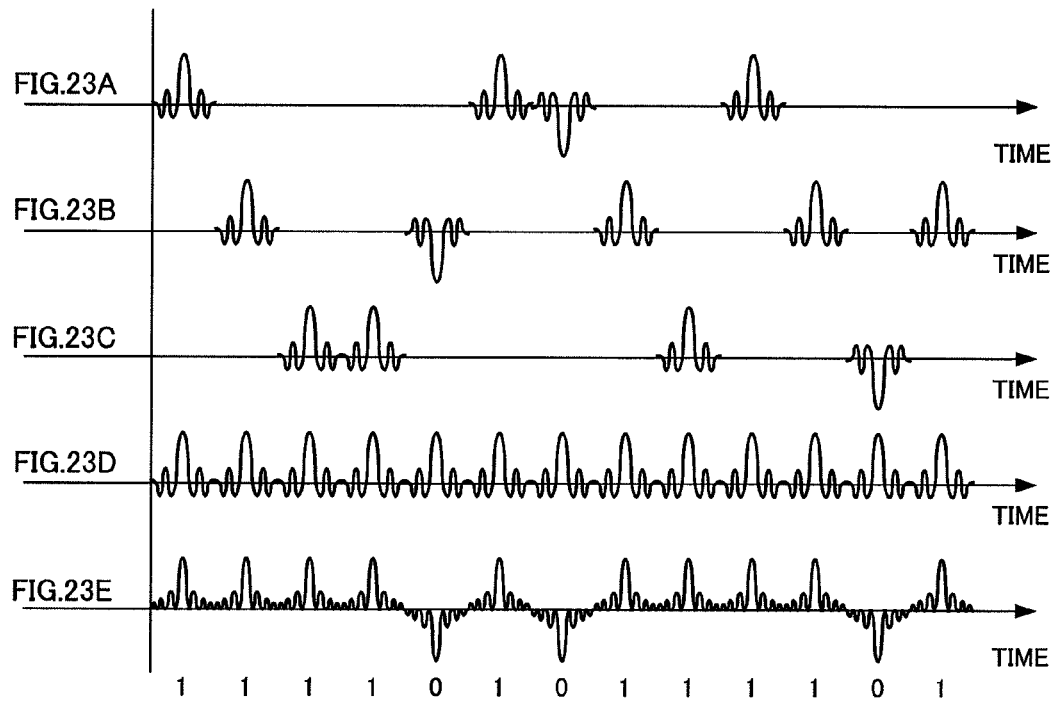
FIG. 23 shows timings of the first to third transmission signals, a template signal, and a result of correlation between the first to third transmission signals and the template signal according to Embodiment 3.

FIG. 23 shows still another example of a pulse signal transmitted from the communication apparatus of Embodiments 1 and 2. FIG. 23 shows a state where the first transmission signal (FIG. 23A), the second transmission signal (FIG. 23B) and the third transmission signal (FIG. 23C) transmitted from communication apparatus 100 having three antennas, arrive at terminal 200. As shown in FIG. 23, the first, second and third transmission signals arrive at terminal 200 after timings are adjusted so that the transmission signals do not overlap at the same timing.

Figure 24:
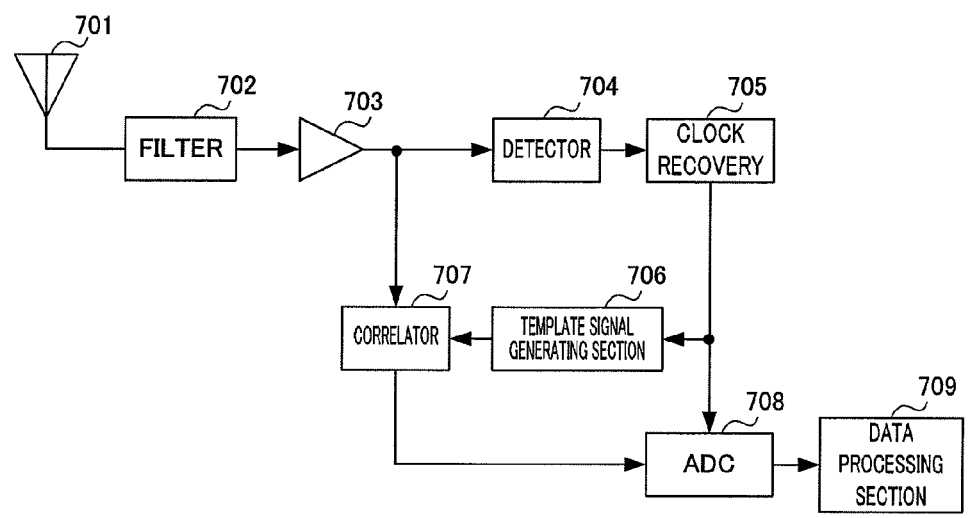
FIG. 24 is a block diagram showing the main configuration of the terminal according to Embodiment 3.

FIG. 24 shows the main configuration of terminal 200 that receives a pulse signal shown in FIG. 23. Terminal 200 shown in FIG. 24 has antenna 701, filter 702, amplifier 703, detector 704, clock recovery 705, template signal generating section 706, correlator 707, ADC 708 and data processing section 709. That is, as shown in FIG. 23A, FIG. 23B and FIG. 23C, when timings are adjusted so that the first, second and third transmission signals do not overlap at the same timing, it is possible to receive all of the first to third transmission signals through single antenna 701, combine the waveforms by calculating the correlations between a template signal (FIG. 23D) generated by template signal generating section 706 and the received signals, and determine "1" or "0" depending on whether the correlation result is positive or negative (FIG. 23E), and it is possible to perform demodulation processing even when communication apparatus 100 having three antennas shown in FIG. 16 transmits the first to third transmission signals.

Although FIG. 24 shows a case where terminal 200 performs synchronization detection using a template signal, terminal 200 may perform demodulating processing through delay detection without using a template signal. Further, although a case of BPSK modulation has been described with the above-described example, this is by no means limiting, and demodulation can be performed in the same way also in the case of using other modulation schemes such as OOK modulation and PPM modulation (Pulse Position Modulation).

Figure 25:
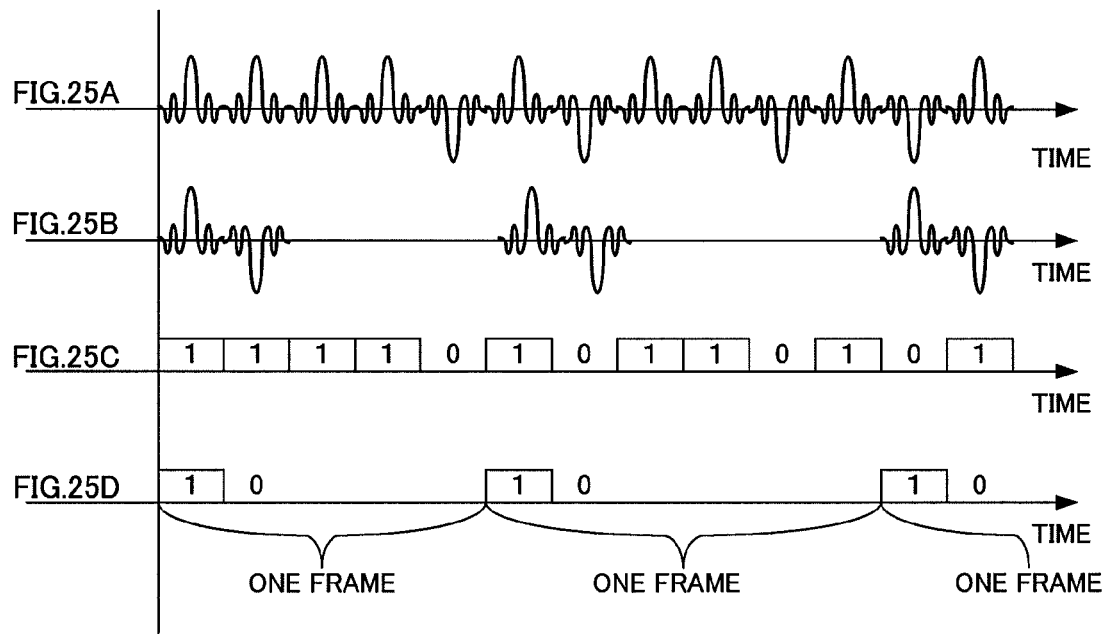
FIG. 25 shows the timings of the first and second transmission signals and demodulated data of the first and second transmission signals according to Embodiment 3.

Further, it is also possible to transmit synchronization information such as frame synchronization information showing the frame timing as a first or second transmission signal. FIG. 25 shows an example of a waveform diagram. The first transmission signal is a BPSK-modulated pulse signal (FIG. 25A), and the second transmission signal is a BPSK-modulated signal showing frame synchronization information (FIG. 25B). FIG. 25C shows data allocated to the first transmission signal obtained as a result of demodulating FIG. 25A, FIG. 25D shows demodulated second transmission data, and timings shown by "1,0" are frame synchronization timings. As described above, communication apparatus 100 adjusts transmission timings so that information data and frame synchronization information arrive at associated timings at only terminal 200 having a specific positional relationship, and performs transmission. Therefore, although terminal 200 can acquire frame synchronization correctly even when the frame length changes according to communication quality, information data and frame synchronization information do not arrive at associated timings at terminals other than the terminal having a specific positional relationship, and so frame synchronization cannot be acquired correctly.

Although terminal 200 receives a combined signal of the BPSK-modulated pulse signal transmitted as the first transmission signal and the BPSK-modulated signal showing frame synchronization information transmitted as a second transmission signal, the combined signal is demultiplexed into the pulse signal shown in FIG. 25A and the frame synchronization information shown in FIG. 25B by performing threshold decision on the amplitude level of the combined signal. Further, when the first transmission signal and the second transmission signal are transmitted in different carrier frequencies, by applying band limitation using different filters, the combined signal is demultiplexed in the same way into the pulse signal shown in FIG. 25A and the frame synchronization information shown in FIG. 25B.

Further, as a first or second transmission signal, authentication data for enhancing security and information data may be transmitted in association with each other. By this means, only terminal 200 having a specific positional relationship with communication apparatus 100 can acquire authentication data and information data in association with each other, and, afterward, only terminal 200 located in a specific area can perform authentication and demodulate information data that arrives in synchronization with the authentication data.

As described above, according to this embodiment, information data and synchronization information such as frame synchronization information showing the frame timing are transmitted from antenna 101 or 102 of communication apparatus 100 while transmission timings are adjusted such that information data and synchronization information such as frame synchronization information showing a frame timing arrive at terminal 200 having a specific positional relationship at specified timings, so that only terminal 200 having a specific positional relationship with communication apparatus 100 can acquire frame synchronization correctly and demodulate an information data stream correctly. That is, by combining information data and frame synchronization information, it is possible to demodulate an information data stream correctly. The number of antennas is not limited to three, and it is also possible to implement the present invention using two or four or more antennas.

(Embodiment 4)

Figure 26:
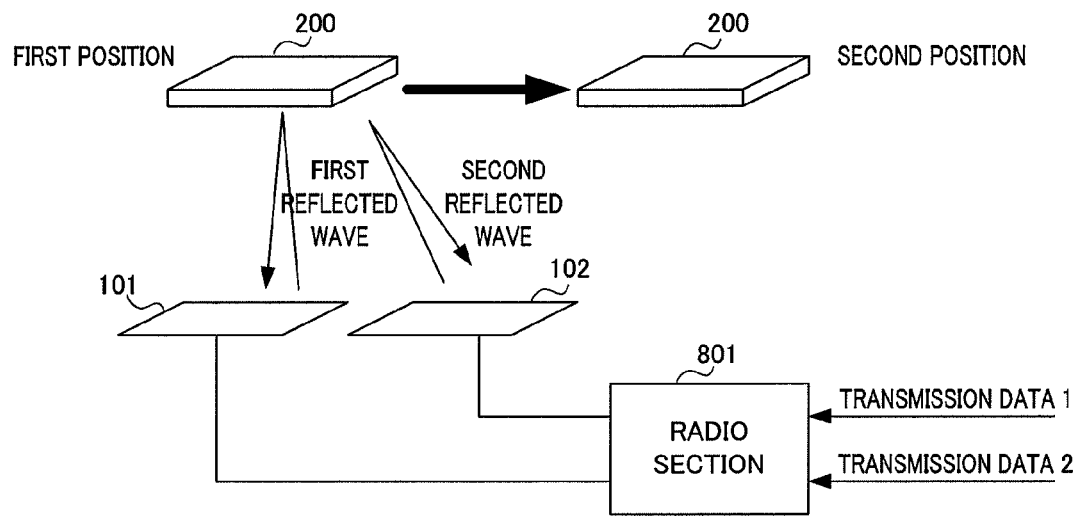
FIG. 26 shows an example of a radio system according to Embodiment 4 of the present invention.
Figure 27:
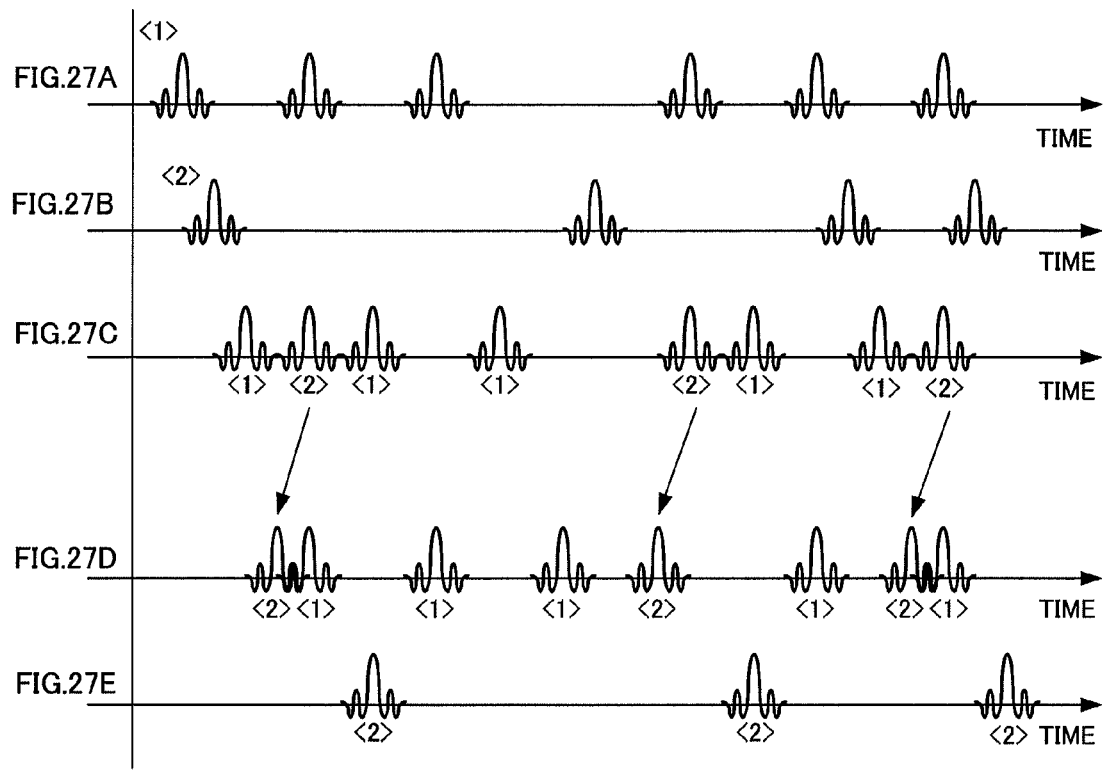
FIG. 27 shows a transmission timing of the first and second transmission signals, arriving timings of the first and second transmission signals at a first position, arriving timings of the first and second transmission signals at a second position, and an arriving timing of the second transmission signal at the second position after the timing is adjusted, according to Embodiment 4.

In Embodiment 4 of the preset invention, a radio system configured with communication apparatus 100 according to Embodiments 1 and 2 and terminal 200 according to Embodiment 3 will be described. FIG. 26 shows an example of the radio system according to Embodiment 4. As shown in FIG. 26, in the radio system according to Embodiment 4, terminal 200 is intentionally moved from the first position to a second position and the timings of the transmission signals transmitted to the terminal moved to the second position are adjusted. In FIG. 26, radio section 801 has a common configuration with radio section 103 according to either Embodiment 1 or Embodiment 2, and therefore the explanation thereof will be omitted. Next, the operation of the radio system configured as described above will be described using the waveform diagram in FIG. 27. FIG. 27 shows the arriving timings of the first and second transmission signals arriving at the terminal at the first and second positions. In FIG. 27, <1> and <2> show the first transmission signal and the second transmission signal, respectively, transmitted from antennas 101 and 102 of communication apparatus 100.

First, communication apparatus 100 adjusts the timing of the first transmission signal transmitted from antenna 101 using the above-described method, and transmits the first transmission signal (FIG. 27A) and the second transmission signal (FIG. 27B) to terminal 200 at the first position. The first transmission signal and the second transmission signal transmitted from communication apparatus 100 arrive at terminal 200 at specified timings (FIG. 27C), and so, by receiving and combining these transmission signals, terminal 200 can demodulate an information data stream.

The information data stream is demodulated at terminal 200, and, after a predetermined time passes, a command to move from the first position to a second position is reported from communication apparatus 100 to terminal 200. By this means, the user having terminal 200 which receives the command to move the position moves the position of terminal 200 from the first position to the second position. The present invention is not limited to a case where the user moves the position of terminal 200, and, for example, the user may put terminal 200 on a predetermined tray or the like and move the tray.

FIG. 27D shows a state of timings at which, immediately after terminal 200 moves to the second position, first and second transmission signals transmitted from communication apparatus 100 arrive at terminal 200. After a move, the arriving times from the respective antennas change, and so the first and second transmission signals do no arrive at terminal 200 at specified timings, and errors increase in an information data stream demodulated by terminal 200.

Therefore, in the radio system in this embodiment, the arriving time difference caused by the difference of paths between the first transmission signal transmitted again from antenna 101 to terminal 200 after a move and the second transmission signal transmitted again from antenna 102 to terminal 200 after a move is calculated for terminal 200 which moves to the second position, using the above-described steps upon initial setting and start of communication. In the same way as Embodiments 1 and 2, the transmission timing of the first transmission signal is adjusted. In this way, the first and second transmission signals arrive at terminal 200 having moved to the second position at specified timings, and terminal 200 receives the first and second transmission signals and demodulates the information data stream.

As described above, according to this embodiment, after the transmission timings are adjusted so that the first and second transmission signals transmitted from communication apparatus 100 arrive at the terminal located at the first position at specified timings, terminal 200 receives a command reported from communication apparatus 100 and is moved to the second position, and the transmission timings are adjusted so that the first and second transmission signals transmitted from communication apparatus 100 arrive at terminal 200 located at the second position after a move at specified timings.

Therefore, although, before a move, demodulation is possible at other positions which have the same distance relationship as the distance between communication apparatus 100 and the first position of terminal 200, after a move, demodulation is possible only at positions which have the same distance relationship as the distance between communication apparatus 100 and the second position of terminal 200 after a move, so that it is possible to limit the positional relationship of terminal 200 that can communicate with communication apparatus to a further limited area.

Figure 28:
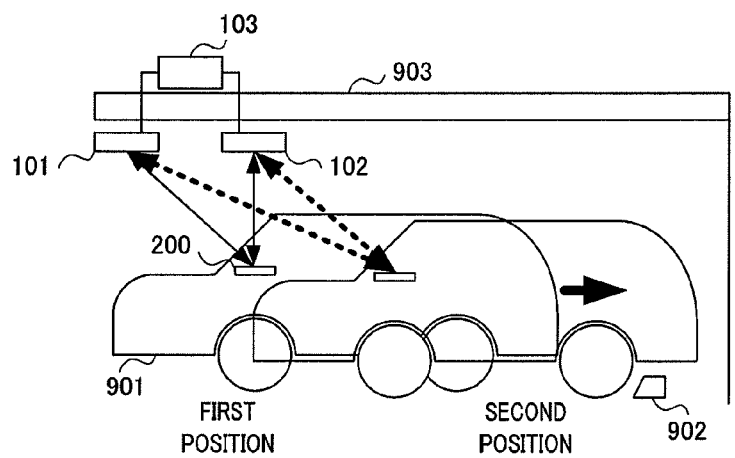
FIG. 28 shows an example of a radio system according to Embodiment 4.

Although an example has been described with this embodiment where a card terminal such as RFID (Radio Frequency Identification) is assumed, the present invention is applicable to in-vehicle terminals. FIG. 28 shows an example of arrangement of a communication system which applies the present invention to an in-vehicle terminal. In FIG. 28, which is an example of a communication system utilizing parking space, the parking space has car stop 902 for limiting the parking position, first antenna 101, second antenna 102, radio section 103 and roof 903, and radio section 103 is provided on roof 903.

The first position may be at any position in the communication area and is not limited particularly, and in-vehicle terminal 200 performs communication at two or more positions and thereby demodulates an information data stream transmitted from communication apparatus 100 correctly.

That is, when vehicle 901 parks in the parking space, communication apparatus 100 adjusts the transmission timing before or after vehicle 901 moves from the first position to the second position, which makes terminals other than in-vehicle terminal 200 unable to demodulate the information data stream transmitted from communication apparatus 100 and have difficulty receiving the information data stream.

By this means, a vehicle having in-vehicle terminal 200 can obtain information of shops and information of the community after parking in a parking lot for shopping.

(Embodiment 5)

Figure 29:
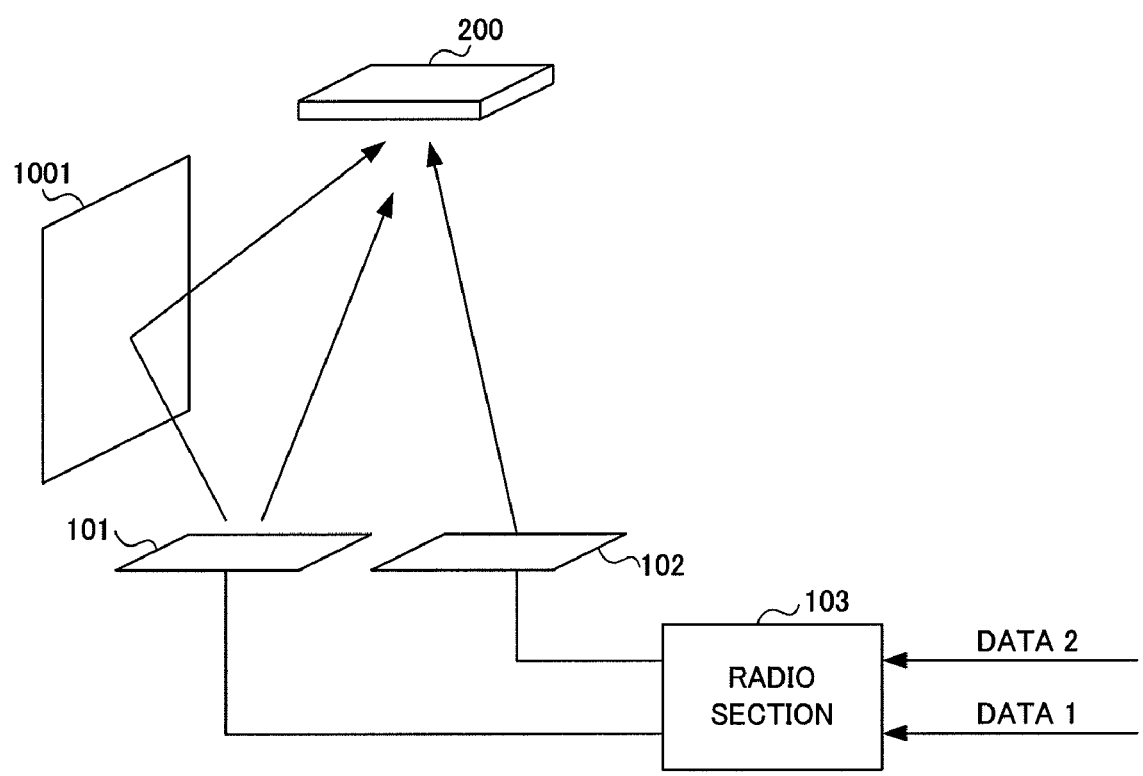
FIG. 29 shows an example of a radio system according to Embodiment 5 of the present invention.

In Embodiment 5 of the present invention, a radio system configured with communication apparatus 100 in Embodiment 1 and Embodiment 2 and terminal 200 in Embodiment 3, will be described. FIG. 29 shows an example of a radio system according to Embodiment 5. As shown in FIG. 29, the radio system according to Embodiment 5 has reflector 1001, and is different from the above-described embodiments in that antenna 101 transmits a first transmission signal to reflector 1001, and has the same main configuration of communication apparatus 100 and terminal 200 as the above-described embodiments. That is, in this embodiment, instead of using the direct wave of the first transmission signal transmitted from antenna 101, using a reflected wave which is the first transmission signal transmitted from antenna 101, reflected by reflector 1001 and arriving at terminal 200, the arriving time difference between antenna 101 and antenna 102 and terminal 200 is calculated, and the transmission timings are adjusted.

Although the path difference of approximately 30 cm is generally required to provide the time difference of 1 ns, as described above, according to this embodiment, by providing reflector 1001 and making the path difference long in a pseudo manner, the arriving time difference can be made long, so that it is possible to configure a radio system that enables only the terminal having a specific positional relationship to communicate with the communication terminal even in a state where antenna 101 and antenna 102 are arranged close. Further, antenna 101 and antenna 102 can be arranged close, so that it is possible to realize smaller communication apparatus 100. The transmission timing of the second transmission signal transmitted from second antenna 102 can be also adjusted using a reflected wave instead of the direct wave.

Further, although a case has been described with above-described Embodiments 3 to 5 where the OOK modulation scheme and the BPSK modulation scheme are used as modulation schemes, this is by no means limiting, and the same effect can be obtained by using the PPM modulation scheme, ASK (Amplitude Shift Keying) modulation scheme, multi-ASK modulation scheme, PSK (Phase Shift Keying) modulation scheme, multi-PSK modulation scheme and modulation schemes combining these.

Although a case has been described with the above-described embodiments where only communication apparatus 100 adjusts the transmission timings, terminal 200 may be configured to have a function of adjusting the timings in the same way as communication apparatus 100, correct a minute drift by fine-adjusting the timings of the transmission signals transmitted from a plurality of antennas and improve reception sensitivity.

Further, communication apparatus 100 may be coordinated with terminal 200, and the timings of the transmission signals transmitted from a plurality of antennas may be changed after a predetermined time passes. For example, first, an agreement to combine the first transmission signal with delay time 0 and the second transmission signal with delay time $\tau$ is made, and, after predetermined time T passes, communication apparatus 100 transmits only the second transmission signal with a delay of $\tau \times 2$, and terminal 200 combines the second transmission signal with delay time 0, so that demodulation can be continued in the same state as the initial state. $\tau$ and T are arbitrary times.

Only a case has been described with the above-described embodiments where the timings are adjusted using the time difference between the transmission signal transmitted from an antenna and a reflected signal, the present invention can be also implemented using a method of returning from terminal 200 a response signal according to the transmission signal after an appropriate time passes, and calculating timings for adjustment using the time difference between the transmission signal and the response signal. Alternatively, the present invention can be also implemented in the same way by combining adjustment using a reflected signal and adjustment of returning a response signal after the above-described time passes. The signal level of the response signal is less likely to be missed substantially, so that it is possible to simplify the timing adjustment at the transmitting side using the response signal. Further, although, when a response signal is used, internal delay at the equipment side that responds cannot be estimated correctly and errors occur, when a reflected signal is used, there is no delay, so that it is possible to improve timing calculation accuracy by combining these adjustments.

Although a reflected wave reflected by an object other than reflector 1001 may arrive at terminal 200, unless this reflected wave arriving at terminal 200 due to the influence of multi-path is combined at an appropriate timing, the reflected wave is not sampled by an A/D converter or the like upon reception and modulation, and so the reflected wave is little likely to influence an information data stream to be demodulated.

Further, when the reception timing of a reflected wave, which is the first transmission signal transmitted from antenna 101, reflected by reflector 1001 and arriving at terminal 200, matches the reception timing of the direct wave of the second transmission signal transmitted from the other antenna 102 by chance, and an information data stream to be demodulated is influenced, by further changing the timing for transmitting the second transmission signal from antenna 102 and transmitting the second transmission signal, for example, at the timing that provides a great effect of removing multipath influence by error correction, the influence of a reflected wave reflected by an object other than reflector 1001 on the information data stream may be reduced.

The communication apparatus of the present invention according to one aspect includes: a first generating section that generates a first transmission signal based on an information data stream; a second generating section that generates a second transmission signal that enables demodulation of the information data stream by being combined with the first transmission signal at a specified timing; a first antenna that transmits the first transmission signal; a second antenna that transmits the second transmission signal; and an adjusting section that adjusts a transmission timing of at least one of the first transmission signal and the second transmission signal such that the first transmission signal and the second transmission signal arrive in a specific area at specified timings.

According to this configuration, the first transmission signal and the second transmission signal transmitted from the two antennas are made to arrive in the specific area at specified timings, and so only communicating parties located in the specific area can demodulate the information data stream using the first transmission signal generated based on the information data stream and the second transmission signal, so that it is possible to limit the area where communication is possible to an extremely limited area with a relatively simple configuration.

The communication apparatus of the present invention according to one aspect includes a time difference calculating section that calculates a time difference between a time the first transmission signal arrives in the specific area and a time the second transmission signal arrives in the specific area, and in the communication apparatus, the adjusting section adjusts a transmission timing of at least one of the first transmission signal and the second transmission signal based on the time difference such that the first transmission signal and the second transmission signal arrive in the specific area at the specified timings.

According to this configuration, the arriving time difference between the time the first transmission signal transmitted from the first antenna arrives in the specific area and the time the second transmission signal transmitted from the second antenna arrives in the specific area can be calculated, so that, even when the position of the communicating party is changed, it is possible to transmit the first transmission signal and the second transmission signal that enable only the communicating party after the change to demodulate the information data stream.

According to one aspect of the communication apparatus of the present invention, the time difference calculating section calculates the time difference from a round-trip time T1 of a signal on a transmission path between the first antenna and the second antenna, and a round-trip time T2 of a signal on a transmission path between one of the first antenna and the second antenna and the specific area.

According to this configuration, when the communicating party is located between the first antenna and the second antenna, the time difference the transmission signals transmitted from the first antenna and the second antenna arrive at the communicating party can be calculated, the transmission timings can be adjusted using the calculated time difference so that the first transmission signal and the second transmission signal arrive at the communicating party in a specified order, and only the communication apparatus located between the first antenna and the second antenna can decode the information data stream.

According to one aspect of the communication apparatus of the present invention, the time difference calculating section calculates the round-trip time T1 using the second transmission signal which is reflected by the first antenna and received by the second antenna or the first transmission signal which is reflected by the second antenna and received by the first antenna and calculates the round-trip time T2 using one of the first transmission signal which is reflected in the specific area and received by the first antenna and the second transmission signal which is reflected in the specific area and received by the second antenna.

According to this configuration, round-trip time T1 of the signal on the transmission path between the first antenna and the second antenna can be calculated from the time it takes the first transmission signal to be reflected by the second antenna and return to the first antenna or the time it takes the second transmission signal to be reflected by the first antenna and return to the second antenna. Further, round-trip time T2 can be calculated from the time it takes the first transmission signal or the second transmission signal to be reflected by the communicating party and return to the antennas, and the transmission timings can be adjusted from the calculated round-trip time so that the first transmission signal and the second transmission signal arrive at only the communicating party in a specified order.

According to one aspect of the communication apparatus of the present invention, the time difference calculating section calculates the time difference from a round-trip time T3 of a signal on a transmission path between the first antenna and the specific area and a round-trip time T4 of a signal on a transmission path between the second antenna and the specific area.

According to this configuration, even when the communicating party is not located between the first antenna and the second antenna, it is possible to calculate the time difference the transmission signals transmitted from the first antenna and the second antenna arrive at the communicating party, adjust the transmission timings so that the first transmission signal and the second transmission signal arrive at the communicating party in a specified order, and ease the restrictions for the positional relationship between the communicating party that can decode the information data stream and the antennas.

According to one aspect of the communication apparatus of the present invention, the time difference calculating section calculates the round-trip time T3 using the first transmission signal which is reflected in the specific area and received by the first antenna and calculates the round-trip time T4 using the second transmission signal which is reflected in the specific area and received by the second antenna.

According to this configuration, it is possible to calculate round-trip time T3 of the signal on the transmission path between the first antenna and the communicating party from the time it takes the first transmission signal to be reflected by the communicating party and return to the first antenna, calculate round-trip time T4 of the signal on the transmission path between the second antenna and the communicating party from the time it takes the second transmission signal to be reflected by the communicating party and return to the second antenna, and adjust the transmission timings from the calculated round-trip times so that the first transmission signal and the second transmission signal arrive at only the communicating party in a specified order.

According to one aspect of the communication apparatus of the present invention, the second generating section generates a reference signal for the first transmission signal as the second transmission signal, and the adjusting section adjusts transmission timings such that the first transmission signal and part of the second transmission signal arrive in the specific area at the same time.

According to this configuration, the first transmission signal and part of the second transmission signal, which is a reference signal of the first transmission signal, are made to arrive at only communicating parties located in the specific area at the same time, so that it is possible to perform synchronous demodulation on the information data stream with reference to the reception timing at which the second transmission signal arrives at the communicating party.

According to one aspect of the communication apparatus of the present invention, the reference signal comprises symbol synchronization information showing a phase timing of the first transmission signal, frame synchronization information showing a frame timing of a communication frame or authentication information.

According to this configuration, the symbol synchronization information showing the phase timing and the frame synchronization information arrive at only communicating parties located in the specific area as the second transmission signal in synchronization with the first transmission signal, so that only the communicating parties located in the specific area can acquire symbol synchronization and frame synchronization correctly and demodulate the information data stream correctly. Further, the authentication information arrives at only communicating parties located in the specific area as the second signal in synchronization with the first transmission signal, so that only the communicating parties located in the specific area can perform authentication and demodulate the information data stream which arrives in synchronization with the authentication data, correctly.

According to one aspect of the communication apparatus of the present invention, the first and second generating sections generate pulse signals as the first and second transmission signals, and the adjusting section adjusts transmission timings such that the first transmission signal and the second transmission signal arrive in the specific area alternately.

According to this configuration, the first transmission signal and the second transmission signal arrive at only communicating parties located in the specific area alternately, so that, for example, when the second transmission signal is made a reference signal for the first transmission signal, only the communicating parties located in the specific area can perform synchronous demodulation on the information data stream using the first transmission signal and the second transmission signal.

According to one aspect of the communication apparatus of the present invention, the second generating section generates a timing signal of the first transmission signal as the second transmission signal, and the adjusting section adjusts transmission timings such that the first transmission signal and part of the second transmission signal arrive in the specific area at the same time.

According to this configuration, the first transmission signal and part of the second transmission signal, which is a timing signal for the first transmission signal, can arrive at only communicating parties located in the specific area at the same time, so that it is possible to perform synchronous demodulation on the information data stream with reference to the reception timing at which the second transmission signal arrives at the communicating party.

According to one aspect of the communication apparatus of the present invention, the timing signal comprises a clock signal for synchronization.

According to this configuration, the clock signal for synchronization of the first transmission signal arrives at only communicating parties located in the specific area as the second transmission signal in synchronization with the first transmission signal, so that the communicating party located in the specific area can perform synchronous demodulation on the information data stream reliably using the second transmission signal as the clock signal for synchronization.

According to one aspect of the communication apparatus of the present invention, the time difference calculating section measures the time difference at predetermined time intervals.

According to this configuration, the time difference is measured at predetermined time intervals, and so the transmission timings are adjusted every predetermined time, so that, even when the position of the communicating party moves in the communication area, the transmission timings can be adjusted so that the first transmission signal and the second transmission signal arrive at the communicating party after a move in a specified order, and the communication apparatus can decode the information data stream.

The communication apparatus of the present invention according to one aspect further includes a reporting section that reports a command to move a position, to a communicating party located in the specific area, and in the communication apparatus, the time difference calculating section calculates the time difference again from a time the first transmission signal arrives in an area the communicating party after a move is located, and a time the second transmission signal arrives in an area the communicating party after the move is located, and the adjusting section adjusts transmission timings based on the time difference calculated again.

According to this configuration, the position of the communicating party is moved, the difference between the time it takes the first transmission signal transmitted from the first antenna to arrive at the communicating party after a move and the time it takes the second transmission signal transmitted from the second antenna to arrive at the communicating party is calculated again, and the transmission timings are adjusted by the adjusting section using the calculated time difference, so that the first transmission signal and the second transmission signal arrive at the communicating party located in the area after a move at specified timings, and the area where communication is possible can be limited to a more limited range.

According to one aspect of the communication apparatus of the present invention, at least one of the first antenna and the second antenna performs transmission to a specific fixture fixed in a direction different from the specific area.

According to this configuration, when the time differences equivalent to the path differences between the first and second antennas and the communicating party located in the specific area are calculated, instead of calculating the time differences from the time the transmission signals transmitted from the first and second antennas arrive at the communicating party directly, by calculating at least one of the time differences from the time it takes the transmission signal to arrive at the communicating party via a specific fixture fixed in a different direction from the position of the communicating party located in the specific area, even when the first and second antennas are close, it is possible to make the path differences long in a pseudo manner and realize a smaller communication apparatus by arranging the first antenna and the second antenna close.

The communication apparatus of the present invention according to one aspect of the present invention includes a frequency converting section that converts a frequency of at least one of the first transmission signal and the second transmission signal to a signal in a different carrier frequency band.

According to this configuration, it is possible to transmit an information data stream with a relatively small amount of data, such as authentication data, using a microwave band with few errors, and, once authentication and the like is established, it is possible to transmit the information data stream with high capacity at high speed using a millimeter wave band.

According to one aspect of the communication apparatus of the present invention, a measuring section that measures a first delay time and a second delay time it takes a first delay signal and a second delay signal of the first transmission signal and the second transmission signal, produced by influence of multipath, to arrive in the specific area after the first transmission signal and the second transmission signal arrive, and in the communication apparatus, the first and the second generating sections generate the first and second transmission signals based on the first and second delay times.

According to this configuration, when the OOK modulation scheme that transmits the "1's" included in the information data stream using ON-signals is adopted, and the direct wave and the delay wave of the first transmission signal transmitted from the first antenna arrive at the communicating party at different phases, the "1's" included in the information data stream can be distributed to the first transmission signal transmitted from the first antenna and the second transmission signal transmitted from the second antenna, so that the direct wave and the delay wave are less likely to arrive at the communicating party at different phases and to be combined to cancel out each other, and demodulation errors due to intersymbol interference can be reduced.

According to one aspect of the communication apparatus of the present invention, the specific area is a predetermined location.

According to this configuration, the arriving time difference between the time the first transmission signal transmitted from the first antenna arrives in the specific area and the time the second transmission signal transmitted from the second antenna arrives in the specific area is known, so that it is possible to save the amount of calculation for the arriving time difference and adjust the transmission timings.

According to one aspect of the communication apparatus of the present invention, the first transmission signal and the second transmission signal are differentially coded signals.

According to this configuration, only the communication apparatus located in the specific area at which the first transmission signal and the second transmission signal arrive in a specified order performs differential decoding and can decode the information data stream.

The communication method of the present invention according to one aspect includes the steps of: generating a first transmission signal based on an information data stream; generating a second transmission signal that enables demodulation of the information data stream by being combined with the first transmission signal at a specified timing; transmitting the first transmission signal; transmitting the second transmission signal; and adjusting a transmission timing of at least one of the first transmission signal and the second transmission signal such that the first transmission signal and the second transmission signal arrive in a specific area at specified timings.

According to this method, the first transmission signal and the second transmission signal transmitted from the two antennas are made to arrive in the specific area at specified timings, so that only communicating parties located in the specific area can demodulate the information data stream using the first transmission signal generated based on the information data stream and the second transmission signal, and limit the area where communication is possible to an extremely limited area with a relatively simple configuration.

The present application is based on Japanese Patent Application No. 2005-344173, filed on Nov. 29, 2005, and Japanese Patent Application No. 2006-300576, filed on Nov. 6, 2006, the entire content of which is expressly incorporated by reference herein.

Industrial Applicability

The communication apparatus and communication method of the present invention can provide a communication apparatus and communication method that allow only the terminal apparatus having a specific positional relationship to communicate, and are suitable for use as, for example, a communication apparatus and communication method applied to a communication system where only a limited area is set as a communication area.

The invention claimed is:

1. A communication apparatus comprising:
a first generator that generates a first transmission signal based on an information data stream;
a second generator that generates a second transmission signal that enables demodulation of the information data stream by being combined with the first transmission signal at a specified timing;
a first antenna that transmits the first transmission signal;
a second antenna that transmits the second transmission signal;
an adjuster that adjusts a transmission timing of at least one of the first transmission signal and the second transmission signal such that the first transmission signal and the second transmission signal arrive in a specific area at specified timings; and
a time difference calculator that calculates a time difference between a time the first transmission signal arrives in the specific area and a time the second transmission signal arrives in the specific area,
wherein the adjuster adjusts a transmission timing of at least one of the first transmission signal and the second transmission signal based on the time difference such that the first transmission signal and the second transmission signal arrive in the specific area at the specified timings,
wherein the time difference calculator calculates the time difference from a round-trip time T1 of a signal on a transmission path between the first antenna and the second antenna, and a round-trip time T2 of a signal on a transmission path between one of the first antenna and the second antenna and the specific area; and
wherein the time difference calculator calculates the round-trip time T1 using the second transmission signal which is reflected by the first antenna and received by the second antenna or the first transmission signal which is reflected by the second antenna and received by the first antenna and calculates the round-trip time T2 using one of the first transmission signal which is reflected in the specific area and received by the first antenna and the second transmission signal which is reflected in the specific area and received by the second antenna.

2. The communication apparatus according to claim 1, wherein the time difference calculator calculates the time difference from a round-trip time T3 of a signal on a transmission path between the first antenna and the specific area and a round-trip time T4 of a signal on a transmission path between the second antenna and the specific area.

3. The communication apparatus according to claim 2, wherein the time difference calculator calculates the round-trip time T3 using the first transmission signal which is reflected in the specific area and received by the first antenna and calculates the round-trip time T4 using the second transmission signal which is reflected in the specific area and received by the second antenna.

4. The communication apparatus according to claim 1, wherein:
the second generator generates a reference signal for the first transmission signal as the second transmission signal; and
the adjustor adjusts transmission timings such that the first transmission signal and part of the second transmission signal arrive in the specific area at the same time.

5. The communication apparatus according to claim 4, wherein the reference signal comprises symbol synchronization information indicating a phase timing of the first transmission signal, frame synchronization information indicating a frame timing of a communication frame or authentication information.

6. The communication apparatus according to claim 1, wherein:
the first and second generators generate pulse signals as the first and second transmission signals; and
the adjustor adjusts transmission timings such that the first transmission signal and the second transmission signal arrive in the specific area alternately.

7. The communication apparatus according to claim 1, wherein:
the second generator generates a timing signal of the first transmission signal as the second transmission signal; and
the adjustor adjusts transmission timings such that the first transmission signal and part of the second transmission signal arrive in the specific area at the same time.

8. The communication apparatus according to claim 7, wherein the timing signal comprises a clock signal for synchronization.

9. The communication apparatus according to claim 1, wherein the time difference calculator measures the time difference at predetermined time intervals.

10. The communication apparatus according to claim 1, wherein at least one of the first antenna and the second antenna performs transmission to a specific fixture fixed in a direction different from the specific area.

11. The communication apparatus according to claim 1, further comprising a frequency converter that converts a frequency of at least one of the first transmission signal and the second transmission signal to a signal in a different carrier frequency band than a carrier frequency band of at least one of the first transmission signal and the second transmission signal.

12. The communication apparatus according to claim 1, wherein the specific area is a predetermined location.

13. The communication apparatus according to claim 1, wherein the first transmission signal and the second transmission signal are differentially coded signals.

14. A communication apparatus comprising:
a first generator that generates a first transmission signal based on an information data stream;
a second generator that generates a second transmission signal that enables demodulation of the information data stream by being combined with the first transmission signal at a specified timing;
a first antenna that transmits the first transmission signal;
a second antenna that transmits the second transmission signal;
an adjuster that adjusts a transmission timing of at least one of the first transmission signal and the second transmission signal such that the first transmission signal and the second transmission signal arrive in a specific area at specified timings; and
a reporter that reports a command to move a position, to a communicating party located in the specific area, wherein:
a time difference calculator calculates the time difference again from a time the first transmission signal arrives in an area the communicating party is located after a move, and a time the second transmission signal arrives in an area the communicating party is located after the move; and
the adjustor adjusts transmission timings based on the time difference calculated again.

15. A communication apparatus comprising:
a first generator that generates a first transmission signal based on an information data stream;
a second generator that generates a second transmission signal that enables demodulation of the information data stream by being combined with the first transmission signal at a specified timing;
a first antenna that transmits the first transmission signal;
a second antenna that transmits the second transmission signal;
an adjuster that adjusts a transmission timing of at least one of the first transmission signal and the second transmission signal such that the first transmission signal and the second transmission signal arrive in a specific area at specified timings; and
a measurer that measures a first delay signal and a second delay time it takes a first delay signal and a second delay signal of the first transmission signal and the second transmission signal, produced by influence of multipath, to arrive in the specific area after the first transmission signal and the second transmission signal arrive,
wherein the first and the second generators generate the first and second transmission signals based on the first and second delay times.

16. A communication method comprising:
generating a first transmission signal based on an information data stream;
generating a second transmission signal that enables demodulation of the information data stream by being combined with the first transmission signal at a specified timing;
transmitting the first transmission signal;
transmitting the second transmission signal;
adjusting a transmission timing of at least one of the first transmission signal and the second transmission signal such that the first transmission signal and the second transmission signal arrive in a specific area at specified timings; and
calculating a time difference between a time the first transmission signal arrives in the specific area and a time the second transmission signal arrives in the specific area;
wherein
the transmission timing of at least one of the first transmission signal and the second transmission signal being adjusting based on the time difference such that the first transmission signal and the second transmission signal arrive in the specific area at the specified timings;
the time difference being calculating from a round-trip time T1 of a signal on a transmission path between the first antenna and the second antenna, and a round-trip time T2 of a signal on a transmission path between one of the first antenna and the second antenna and the specific area;
the round-trip time T1 being calculating by using the second transmission signal which is reflected by the first antenna and received by the second antenna or the first transmission signal which is reflected by the second antenna and received by the first antenna; and the round-trip time T2 being calculating by using one of the first transmission signal which is reflected in the specific area and received by the first antenna and the second transmission signal which is reflected in the specific area and received by the second antenna.

* * * * *